United States Patent

Yu et al.

(10) Patent No.: US 11,018,775 B2
(45) Date of Patent: May 25, 2021

(54) OPTICAL TRANSMITTER, OPTICAL RECEIVER, AND OPTICAL TRANSMISSION METHOD

(71) Applicant: HUAWEI TECHNOLOGIES CO., LTD., Guangdong (CN)

(72) Inventors: Yi Yu, Dongguan (CN); Yuanda Huang, Dongguan (CN); Liangchuan Li, Dongguan (CN); Xie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/791,381

(22) Filed: Feb. 14, 2020

(65) Prior Publication Data

US 2020/0186255 A1 Jun. 11, 2020

Related U.S. Application Data

(63) Continuation of application No. PCT/CN2017/097670, filed on Aug. 16, 2017.

(51) Int. Cl.
*H04B 10/556* (2013.01)
*H04B 1/707* (2011.01)
(Continued)

(52) U.S. Cl.
CPC ......... *H04B 10/5563* (2013.01); *H04B 1/707* (2013.01); *H04B 10/5051* (2013.01);
(Continued)

(58) Field of Classification Search
CPC .......................... H04B 10/5563; H04B 1/707; H04B 10/6164; H04B 10/616; H04B 10/615;
(Continued)

(56) References Cited

U.S. PATENT DOCUMENTS

| 7,076,168 B1 | 7/2006 | Shattil |
| 7,194,211 B2 * | 3/2007 | Schemmann ...... H04B 10/2513 375/295 |

(Continued)

FOREIGN PATENT DOCUMENTS

| CN | 101369851 A | 2/2009 |
| CN | 101714907 A | 5/2010 |

(Continued)

OTHER PUBLICATIONS

Extended European Search Report issued in European Application No. 17922039.7 dated Aug. 3, 2020, 7 pages.

(Continued)

*Primary Examiner* — Abbas H Alagheband
(74) *Attorney, Agent, or Firm* — Fish & Richardson P.C.

(57) ABSTRACT

An optical transmitter, an optical receiver, and an optical transmission method are disclosed. The optical transmitter includes an optical signal generator, N spreaders, N pairs of data modulators, and a combiner, where the optical signal generator generates N optical carriers; an $i^{th}$ spreader spreads an $i^{th}$ optical carrier, to obtain a spread optical signal having two subcarriers; splits the spread optical signal into a first optical signal and a second optical signal; and delays the second optical signal to obtain a third optical signal; an $i^{th}$ pair of data modulators modulate the first optical signal and the third optical signal to obtain a pair of modulated optical signals, transmit the pair of modulated optical signals to the combiner, where the pair of modulated optical signals reaching the combiner differ by $1/(4\ fsi)$ in time domain; and the combiner combines, into one optical signal, N pairs of modulated optical signals.

5 Claims, 23 Drawing Sheets

(51) Int. Cl.
  *H04B 10/61* (2013.01)
  *H04J 14/00* (2006.01)
  *H04B 10/516* (2013.01)
  *H04B 10/50* (2013.01)

(52) U.S. Cl.
  CPC ..... *H04B 10/5165* (2013.01); *H04B 10/6164* (2013.01); *H04J 14/005* (2013.01); *H04B 10/5053* (2013.01)

(58) Field of Classification Search
  CPC ........ H04J 14/005; H04J 14/007; H04J 13/10; H04L 27/00
  USPC .......................................................... 398/77
  See application file for complete search history.

(56) References Cited

U.S. PATENT DOCUMENTS

| | | | | |
|---|---|---|---|---|
| 7,593,449 B2* | 9/2009 | Shattil | ................... | H04B 1/707 |
| | | | | 375/130 |
| 8,331,419 B2* | 12/2012 | Zhang | ................ | H04L 27/2613 |
| | | | | 375/141 |
| 8,699,882 B2* | 4/2014 | Shieh | ................... | H04L 27/264 |
| | | | | 398/76 |
| 9,584,223 B2* | 2/2017 | Chien | ................. | H04B 10/506 |
| 10,116,410 B2* | 10/2018 | Morsy-Osman | ..... | H04B 10/541 |
| 10,491,261 B1* | 11/2019 | Al-Eidan | ............. | H04B 17/336 |
| 2002/0145787 A1* | 10/2002 | Shpantzer | ............. | H04J 14/005 |
| | | | | 398/99 |
| 2003/0058504 A1* | 3/2003 | Cho | ...................... | H04J 14/005 |
| | | | | 398/147 |
| 2003/0189745 A1* | 10/2003 | Kikuchi | ............. | H04B 10/5053 |
| | | | | 359/237 |
| 2005/0286908 A1* | 12/2005 | Way | ..................... | H04B 10/506 |
| | | | | 398/186 |
| 2006/0147219 A1* | 7/2006 | Yoshino | ................ | H04J 14/007 |
| | | | | 398/183 |
| 2009/0047030 A1 | 2/2009 | Hoshida | | |
| 2019/0342008 A1 | 11/2019 | Huang et al. | | |

FOREIGN PATENT DOCUMENTS

| | | |
|---|---|---|
| CN | 101783972 A | 7/2010 |
| CN | 102142902 A | 8/2011 |
| CN | 102932089 A | 2/2013 |
| EP | 3367593 A1 | 8/2018 |
| JP | 5411538 B2 | 2/2014 |
| WO | 2017084046 A1 | 5/2017 |

OTHER PUBLICATIONS

Office Action issued in Chinese Application No. 2017800890700 dated Mar. 3, 2020, 15 pages (With English Translation).
PCT International Search Report and Written Opinion in International Application No. PCT/CN2017/097,670, dated Apr. 27, 2018, 75 pages (With English Translation).

* cited by examiner

OPTICAL TRANSMITTER, OPTICAL RECEIVER, AND OPTICAL TRANSMISSION METHOD

CROSS-REFERENCE TO RELATED APPLICATIONS

This application is a continuation of International Application No. PCT/CN2017/097670, filed on Aug. 16, 2017, the disclosure of which is hereby incorporated by reference in its entirety.

TECHNICAL FIELD

This application relates to the field of optical communications technologies, and in particular, to an optical transmitter, an optical receiver, and an optical transmission method.

BACKGROUND

As a capacity of an optical fiber transmission system gradually increases, a requirement on a transmission rate of a single port becomes increasingly high. The transmission rate of the single port can be improved by improving a baud rate of a transmission symbol or increasing an order of a modulation format. However, quality of a signal with a high baud rate is limited by analog bandwidth of a digital-to-analog converter (DAC). In addition, a high-order modulation signal (for example, multiple quadrature amplitude modulation (mQAM) requires a high effective bit width of the DAC. When bandwidth of a device is insufficient to support a rate increase of an optical transmission system, a single-carrier system solution can hardly support a capacity of a single port. Therefore, a parallel system solution is required to resolve a problem of a limited single-wavelength rate.

All-optical code division multiplexing is a system solution in which serial data streams are sent in parallel. More importantly, serial data is converted into a plurality of parallel paths, so that a data signal can be separately modulated in each path, thereby reducing a requirement on modulation bandwidth. However, due to code division multiplexing, delay synchronization needs to be performed on a plurality of signals, and a spreading code with a relatively long length needs to be used. As a result, complexity of multi-path demultiplexing is increased.

SUMMARY

Embodiments of this application provide an optical transmitter, an optical receiver, and an optical transmission method, to resolve a prior-art problem of high demultiplexing complexity.

According to a first aspect, an embodiment of this application provides an optical transmitter, including: an optical signal generator, N spreaders, N pairs of data modulators, and a combiner, where N is a positive integer; the optical signal generator is configured to generate N optical carriers with a single wavelength; an $i^{th}$ spreader is configured to: spread an $i^{th}$ optical carrier generated by the optical signal generator, to obtain a spread optical signal having two subcarriers, where frequencies of spread optical signals generated by different spreaders are different; and split the spread optical signal into two signals, where the two signals are a first optical signal and a second optical signal, and delay the second optical signal to obtain a third optical signal; an $i^{th}$ pair of data modulators are configured to: modulate the first optical signal and the third optical signal that are obtained by the $i^{th}$ spreader through processing, to obtain a pair of modulated optical signals, and transmit the pair of modulated optical signals to the combiner, where the pair of modulated optical signals reaching the combiner differ by $1/(4 f_{si})$ in time domain, $f_{si}$ represents a spreading frequency of the $i^{th}$ spreader, the spreading frequency is equal to half of a carrier spacing of the two subcarriers, and i is any positive integer not greater than N; and the combiner is configured to: combine, into one optical signal, N pairs of modulated optical signals transmitted by the N pairs of data modulators, and send the optical signal.

In the foregoing solution, after a spread optical signal generated by a spreader is divided into two signals which are then delayed, spectrums of the two signals overlap, so that spectral efficiency has no loss. In addition, it only needs to ensure that the two signals spread and delayed by the spreader are synchronized with each other, and a spreading code of a relatively long length is not required. Therefore, complexity of demultiplexing a plurality of signals is reduced. In addition, system performance and features can be changed by adjusting a spreading frequency, thereby improving flexibility of a spreading system.

According to a second aspect, an embodiment of this application provides an optical transmitter, including: an optical signal generator, N pairs of spreaders, N pairs of data modulators, and a combiner, where N is a positive integer; and the optical signal generator is configured to: generate 2*N optical carriers with a single wavelength, and transmit each optical carrier to a corresponding spreader; each pair of spreaders in the N pairs of spreaders are configured to: spread, by using corresponding radio frequency signals, two corresponding optical carriers to obtain a pair of spread optical signals having two subcarriers, and transmit the pair of spread optical signals to corresponding data modulators, where frequencies of the radio frequency signals used by each pair of spreaders are equal, and frequencies of radio frequency signals used by any two pairs of spreaders are not equal; each pair of data modulators in the N pairs of data modulators perform, by using the pair of received spread optical signals, data modulation to obtain a pair of modulated optical signals, and transmit the pair of modulated optical signals to the combiner; and the combiner is configured to: combine, into one optical signal, N pairs of modulated optical signals transmitted by the N pairs of data modulators, and send the optical signal, where the radio frequency signals used by each pair of spreaders differ by a preset time length in time domain, so that a pair of modulated optical signals reaching the combiner differ by a quarter of a period of the used radio frequency signals in time domain.

In the foregoing solution, after a spread optical signal generated by a spreader is divided into two signals which are then delayed, spectrums of the two signals overlap, so that spectral efficiency has no loss. In addition, it only needs to ensure that the two signals spread and delayed by the spreader are synchronized with each other, and a spreading code of a relatively long length is not required. Therefore, complexity of demultiplexing a plurality of signals is reduced. In addition, system performance and features can be changed by adjusting a spreading frequency, thereby improving flexibility of a spreading system.

According to a third aspect, an embodiment of this application provides an optical transmitter, including: an optical signal generator, N pairs of data modulators, N spreaders, and a combiner, where N is a positive integer; and the optical signal generator is configured to: generate 2*N optical carriers with a single wavelength, and transmit each optical carrier to a corresponding data modulator; each data modulator in the N pairs of data modulators are configured to performs data modulation by using a corresponding optical carrier to obtain a modulated optical signal, and transmits the modulated optical signal to a corresponding spreader; each pair of spreaders in the N pairs of spreaders are configured to: spread, by using corresponding radio frequency signals, two corresponding modulated optical signals to obtain a pair of spread optical signals having two subcarriers, and transmit the pair of spread optical signals to the combiner, where frequencies of the radio frequency signals used by each pair of spreaders are equal, and frequencies of radio frequency signals used by any two pairs of spreaders are not equal; the radio frequency signals used by each pair of spreaders differ by a preset time length in time domain, so that a pair of spread optical signals reaching the combiner differ by a quarter of a period of the used radio frequency signal in time domain; and the combiner is configured to: combine, into one optical signal, N pairs of spread optical signals transmitted by the N pairs of spreaders, and send the optical signal.

In the foregoing solution, after a spread optical signal generated by a spreader is divided into two signals which are then delayed, spectrums of the two signals overlap, so that spectral efficiency has no loss. In addition, it only needs to ensure that the two signals spread and delayed by the spreader are synchronized with each other, and a spreading code of a relatively long length is not required. Therefore, complexity of demultiplexing a plurality of signals is reduced. In addition, system performance and features can be changed by adjusting a spreading frequency, thereby improving flexibility of a spreading system.

According to a fourth aspect, an embodiment of this application provides an optical receiver, including: a laser, a coherence detector, an analog-to-digital converter, a divider, M multipliers, and a demodulator, where M is equal to a quantity of optical signals combined by a combiner included in an optical transmitter; and the laser is configured to generate a local oscillator optical signal; the coherence detector is configured to perform coherence detection on an optical signal from the optical transmitter by using the local oscillator optical signal generated by the laser, to obtain an analog electrical signal; the analog-to-digital converter is configured to convert the analog electrical signal into a digital electrical signal; the divider is configured to: divide the digital electrical signal into M electrical signals, and transmit the M electrical signals to the M multipliers, where one multiplier corresponds to one electrical signal; each multiplier is configured to multiply a corresponding electrical signal by a corresponding spread spectrum signal to obtain a despread electrical signal, so that M despread optical signals are obtained, where the spread spectrum signal multiplied by each electrical signal is a sinusoidal signal or a cosine signal, and frequencies of the spread spectrum signals multiplied by the M electrical signals are in a one-to-one correspondence with and equal to spreading frequencies used for generating, in the optical transmitter, M optical signals combined by the combiner; and two spread spectrum signals with equal frequencies differ by a quarter of a period in time domain; and the demodulator is configured to demodulate M despread electrical signals to obtain original data corresponding to the optical signal.

In the foregoing solution, when performing despreading and demultiplexing, the optical receiver only needs to multiply each signal by one sinusoidal signal or cosine signal. Therefore, complexity of demultiplexing is reduced.

According to a fifth aspect, an embodiment of this application provides an optical receiver, including: a splitter, a laser, M spreaders, M coherence detectors, and a demodulator, where M is equal to a quantity of optical signals combined by a combiner included in an optical transmitter; and the splitter is configured to: split a to-be-received optical signal from the optical transmitter to obtain M optical signals, and correspondingly transmit the M optical signals to the M coherence detectors, where one coherence detector corresponds to one optical signal; the laser is configured to: generate M local oscillator optical signals, and correspondingly transmit the M local oscillator optical signals to the M spreaders, where one spreader corresponds to one local oscillator optical signal; each spreader is configured to: spread, by using a radio frequency signal, a corresponding local oscillator optical signal to obtain a spread optical signal, and transmit the spread optical signal to a corresponding coherence detector, where frequencies of radio frequency signals used by the M spreaders are in a one-to-one correspondence with and equal to spreading frequencies used by M optical signals that are combined by the combiner in the optical transmitter, and two radio frequency signals with equal frequencies differ by a quarter of a period in time domain; each coherence detector is configured to perform, by using a spread optical signal from a corresponding spreader, correlation detection on an optical signal from a corresponding splitter, to obtain an electrical signal, so that M electrical signals are obtained; and the demodulator is configured to demodulate the M electrical signals to obtain original data corresponding to the to-be-received optical signal.

In the foregoing solution, when performing despreading and demultiplexing, the optical receiver performs frequency shifting in optical domain by using a spread spectrum signal as a coherence detection signal. After local oscillator light is divided into a plurality of signals, and the plurality of signals are separately spread to corresponding frequencies, the plurality of signals are connected to a plurality of coherence detectors together with a to-be-received signal for coherence detection, so that spreading and demultiplexing are implemented, and complexity is relatively low.

According to a sixth aspect, an embodiment of this application provides an optical receiver, including: a splitter, M lasers, M coherence detectors, and a demodulator, where M is equal to a quantity of optical signals combined by a combiner included in an optical transmitter; and the splitter is configured to: split a to-be-received optical signal from the optical transmitter to obtain N optical signals, and correspondingly transmit the N optical signals to the M coherence detectors; each of the M lasers is configured to generate an optical carrier signal, where frequencies of optical carrier signals generated by different lasers are different, and frequencies of M optical carriers generated by the M lasers are in a one-to-one correspondence with and equal to carrier frequencies of M optical signals combined by the combiner included in the transmitter; each coherence detector is configured to perform, by using a received optical carrier signal, correlation detection on an optical signal from the splitter, to obtain an electrical signal, so that M electrical signals are obtained; and the demodulator is configured to separately demodulate the M electrical signals to obtain original data corresponding to the to-be-received optical signal.

In the foregoing solution, when performing despreading and demultiplexing, the optical receiver despreads the to-bereceived optical signal by using a wavelength-independent laser in optical domain. A plurality of local oscillator optical signals that are generated by a plurality of wavelength-independent lasers and that work at different subcarrier frequencies enter a plurality of separate coherence detectors for coherence detection with the to-be-received optical signal, so that spreading and demultiplexing are implemented, and complexity is relatively low.

According to a seventh aspect, based on an inventive concept the same as that of the first aspect, an embodiment of this application provides an optical transmission method, including: generating, by an optical transmitter, N optical carriers with a single wavelength; spreading, by the optical transmitter, an $i^{th}$ optical carrier generated by an optical signal generator, to obtain a spread optical signal having two subcarriers, where frequencies of different spread optical signals are different; and splitting the spread optical signal into two signals, where the two signals are a first optical signal and a second optical signal, and delaying the second optical signal to obtain a third optical signal; modulating, by the optical transmitter, the first optical signal and the third optical signal to obtain a pair of modulated optical signals, where i is any positive integer not greater than N, so that N pairs of modulated optical signals are obtained; and combining, by the optical transmitter, the N pairs of modulated optical signals into one optical signal, and sending the optical signal, where in the combined N pairs of modulated optical signals, an $i^{th}$ pair of modulated optical signals differ by $1/(4\ f_{si})$ in time domain, and f represents a spreading frequency corresponding to the $i^{th}$ optical carrier.

In a possible design, the optical transmitter further generates an $(N+1)^{th}$ optical carrier with the single wavelength, and before combining the N pairs of modulated optical signals into one optical signal, the optical transmitter performs data modulation on the $(N+1)^{th}$ optical carrier with the single wavelength, to obtain a first modulated optical signal. The combining, by the optical transmitter, the N pairs of modulated optical signals into one optical signal includes: combining, by the optical transmitter, the N pairs of modulated optical signals and the first modulated optical signal into one optical signal.

According to an eighth aspect, based on an inventive concept the same as that of the second aspect, an embodiment of this application provides an optical transmission method, including: generating, by an optical transmitter, 2*N optical carriers with a single wavelength, where each two optical carriers in the 2*N optical carriers form a pair of optical carriers; spreading, by the optical transmitter, an $i^{th}$ pair of optical carriers by using an $i^{th}$ pair of radio frequency signals, to obtain an it pair of spread optical signals having two subcarriers, where frequencies of two radio frequency signals included in the it pair of radio frequency signals are equal, and frequencies of any two pairs of radio frequency signals are not equal; and separately performing data modulation on the two spread optical signals included in the $i^{th}$ pair of spread optical signals to obtain an $i^{th}$ pair of modulated optical signals, where i is any positive integer not greater than N, so that N pairs of modulated optical signals are obtained; and combining, by the optical transmitter, the N pairs of modulated optical signals into one optical signal, and sending the optical signal, where the $i^{th}$ pair of radio frequency signals differ by a preset time length in time domain, so that the $i^{th}$ pair of modulated optical signals for combining differ by a quarter of a period of the $i^{th}$ pair of radio frequency signals in time domain.

In a possible design, the optical transmitter further generates an $(2*N+1)^{th}$ optical carrier with the single wavelength, and before combining the N pairs of modulated optical signals into one optical signal, the optical transmitter performs data modulation on the $(2*N+1)^{th}$ optical carrier with the single wavelength, to obtain a first modulated optical signal. The combining, by the optical transmitter, the N pairs of modulated optical signals into one optical signal includes: combining, by the optical transmitter, the N pairs of modulated optical signals and the first modulated optical signal into one optical signal.

According to a ninth aspect, based on an inventive concept the same as that of the third aspect, an embodiment of this application provides an optical transmission method, including: generating, by an optical transmitter, 2*N optical carriers with a single wavelength; separately modulating, by the optical transmitter, the 2*N optical carriers to obtain 2*N modulated optical signals, where each two modulated optical signals in the 2*N modulated optical signals form a pair of modulated optical signals; and spreading an $i^{th}$ pair of modulated optical signals by using an $i^{th}$ n pair of radio frequency signals to obtain an $i^{th}$ pair of spread optical signals having two subcarriers, where frequencies of two radio frequency signals included in the $i^{th}$ pair of radio frequency signals are equal, and frequencies of any two pairs of radio frequency signals are not equal, where i is any positive integer not greater than N, so that N pairs of spread optical signals are obtained; and combining, by the optical transmitter, the N pairs of spread optical signals into one optical signal, and sending the optical signal, where the $i^{th}$ pair of radio frequency signals differ by a preset time length in time domain, so that an $i^{th}$ pair of spread optical signals for combining differ by a quarter of a period of the $i^{th}$ pair of radio frequency signals in time domain.

In a possible design, the optical transmitter further generates an $(2*N+1)^{th}$ optical carrier with the single wavelength, and before combining the N pairs of modulated optical signals into one optical signal, the optical transmitter performs data modulation on the $(2*N+1)^{th}$ optical carrier with the single wavelength, to obtain a first modulated optical signal. The combining, by the optical transmitter, the N pairs of modulated optical signals into one optical signal includes: combining, by the optical transmitter, the N pairs of modulated optical signals and the first modulated optical signal into one optical signal.

According to a tenth aspect, based on an inventive concept the same as that of the fourth aspect, an embodiment of this application provides an optical transmission method, including: generating, by an optical receiver, a local oscillator optical signal; performing, by the optical receiver, coherence detection on a to-be-received optical signal from an optical transmitter by using the local oscillator optical signal, to obtain an analog electrical signal, and converting the analog electrical signal to a digital electrical signal; dividing, by the optical receiver, the digital electrical signal into M electrical signals, and multiplying M electrical signals each by one spread spectrum signal to obtain M despread electrical signals, where the spread spectrum signal multiplied by each electrical signal is a sinusoidal signal or a cosine signal, and frequencies of the spread spectrum signals multiplied by the M electrical signals are in a one-to-one correspondence with and equal to spreading frequencies used for generating M optical signals combined by the optical transmitter; and two spread spectrum signals with equal frequencies differ by a quarter of a period in time domain; and demodulating, by the optical receiver, the M despread electrical signals to obtain original data corresponding to the to-be-received optical signal.

According to an eleventh aspect, based on an inventive concept the same as that of the fifth aspect, an embodiment of this application provides an optical transmission method, including: splitting, by an optical receiver, a to-be-received optical signal from an optical transmitter, to obtain M optical signals; generating, by the optical receiver, M local oscillator optical signals, and spreading the M local oscillator optical signals by using M radio frequency signals, to obtain M spread optical signals, where frequencies of the M radio frequency signals are in a one-to-one correspondence with and equal to spreading frequencies used for generating M optical signals that are combined by the optical transmitter, and two radio frequency signals with equal frequencies differ by a quarter of a period in time domain; performing, by the optical receiver, correlation detection on the M optical signals by using the M spread optical signals, to obtain M electrical signals, where the M spread optical signals are in a one-to-one correspondence with the M optical signals; and separately demodulating, by the optical receiver, the M electrical signals to obtain original data corresponding to the to-be-received optical signal.

According to a twelfth aspect, based on an inventive concept the same as that of the sixth aspect, an embodiment of this application provides an optical transmission method, including: splitting, by an optical receiver, a to-be-received optical signal from an optical transmitter, to obtain M optical signals; generating, by the optical receiver, M optical carrier signals, where frequencies of different optical carrier signals are different, and frequencies of the M optical carriers are in a one-to-one correspondence with and equal to carrier frequencies of M optical signals combined by the optical transmitter; separately performing, by the optical receiver, correlation detection on the M optical signals by using the M optical carrier signals, to obtain M electrical signals, where the M optical carrier signals are in a one-to-one correspondence with the M optical signals; and separately demodulating, by the optical receiver, the M electrical signals to obtain original data corresponding to the to-be-received optical signal.

According to a thirteenth aspect, an embodiment of this application further provides a computer storage medium, and the storage medium stores a software program. When read and executed by one or more processors, the software program can implement the method provided in any one of the seventh aspect to the twelfth aspect.

DESCRIPTION OF EMBODIMENTS

Figure 1:
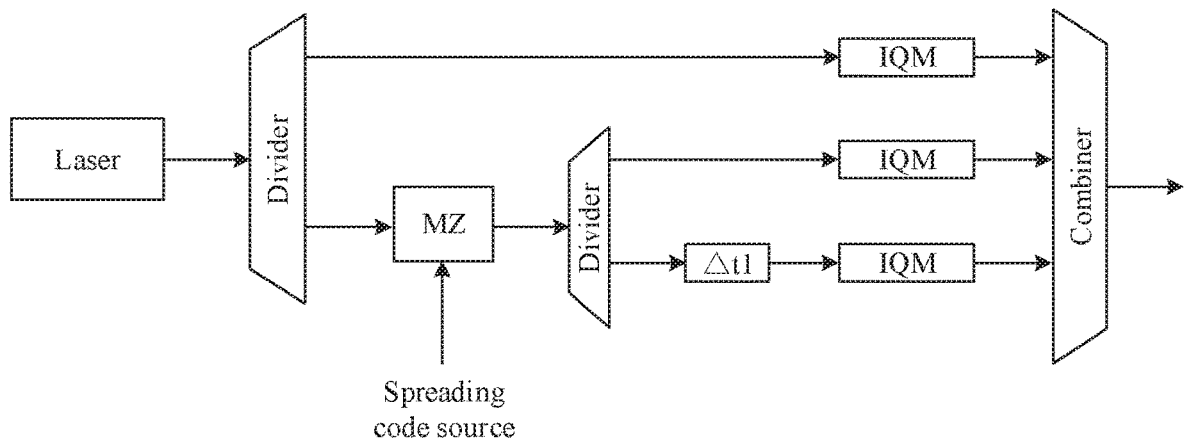
FIG. 1 is a schematic structural diagram of an optical transmitter for optical code division multiplexing according to an embodiment of this application.
Figure 1A:
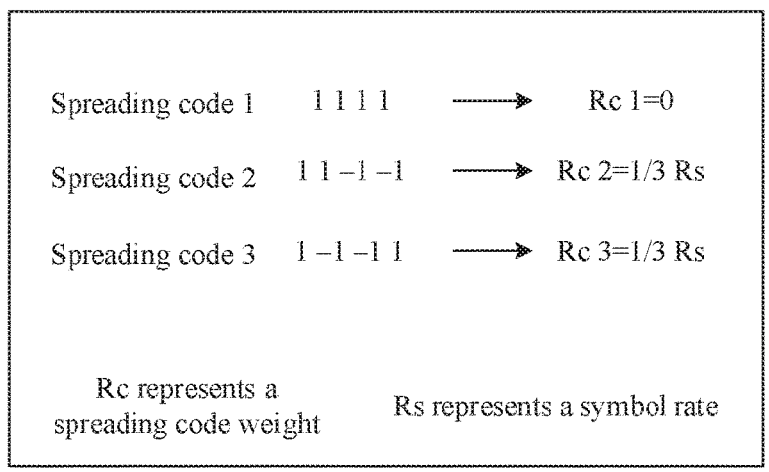
FIG. 1A is a schematic diagram of a spreading code according to an embodiment of this application.

Currently, an optical transmitter based on optical code division multiplexing implements the optical code division multiplexing through two-level optical modulation. FIG. 1 is an architectural diagram of an optical transmitter using an existing solution. An MZ spreads a spreading code source to obtain a spread spectrum signal. After the spread spectrum signal is divided into two signals by a coupler (a splitter), one of the two signals is delayed, specifically, one bit is delayed, to obtain a spreading code 2 and a spreading code 3 shown in FIG. 1. It can be learned from FIG. 1A that the spreading code 3 is obtained by delaying one bit based on the spreading code 2. Therefore, in this solution, delay synchronization of a plurality of signals is required. In addition, as a quantity of signals that need to be spread increases, a length of a spreading code also increases, and complexity of the optical transmitter is increased. In addition, when a receiver performs demultiplexing, complexity of demultiplexing is also increased due to an increase in the spreading code and a limitation of the delay synchronization.

Figure 2:
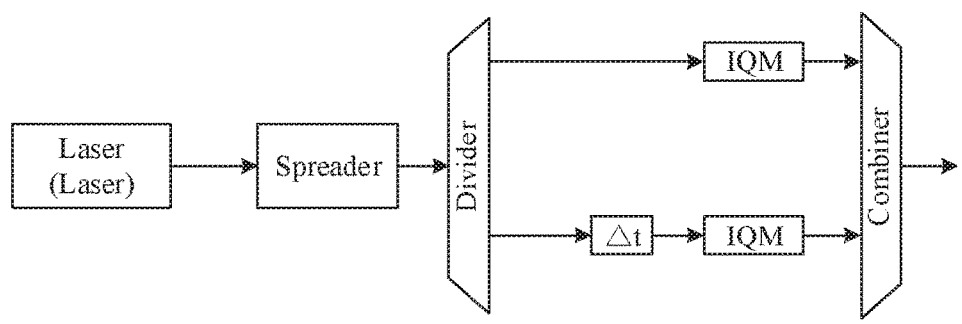
FIG. 2 is a schematic diagram of a spreading solution according to an embodiment of this application.
Figure 2A:
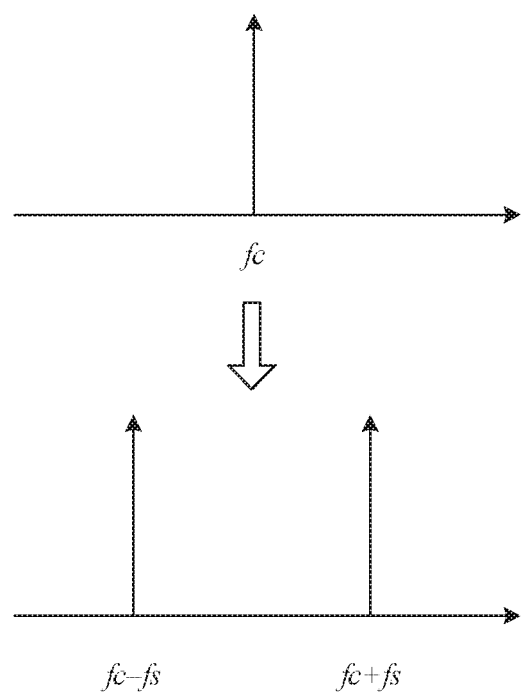
FIG. 2A is a schematic diagram of frequencies of two subcarriers according to an embodiment of this application.

Based on this, the embodiments of this application provide a spreading solution, to generate a pair of spread spectrum signals orthogonal in frequency domain. For a specific generation principle, refer to FIG. 2. An optical carrier with a single wavelength generated by a single-frequency laser (laser) enters a spreader. The spreader may be a passive optical device or an active optical device. The original optical carrier with the single wavelength is spread to a spread optical signal having two subcarriers in frequency domain, and a fixed spacing between the two subcarriers is $2*f_s$. A spacing between the two subcarriers and the original optical carrier is $f_s$. Therefore, $f_s$ is a spreading frequency of the spreader. Assuming that a frequency of an optical carrier generated by the single-frequency laser is $f_c$, and the spreading frequency of the spreader is $f_s$, frequencies of two subcarriers obtained after spreading by the spreader are $f_c-f_s$ and $f_c+f_s$, as shown in FIG. 2A. For ease of subsequent description, a reciprocal of the spreading frequency of the spreader, that is, $1/f_s$, is referred to as a spreading period.

It can be learned from the foregoing description that a signal having two subcarriers whose frequency spacing is $2*f_s$ may be considered as a sinusoidal signal or a cosine signal having a fixed period ($1/f_s$) in time domain. Then, the spread optical signal generated by the spreader is divided into two signals by using a divider. One of the two signals is delayed by using a delayer, and a delay time is $1/(4\ f_s)$. Certainly, the delay time allows a specific error range. The error range may be specifically set according to a system design, and therefore, the delay time is essentially $1/(4\ f_s)$. Therefore, the two signals may be considered as sinusoidal signals or cosine signals that substantially differ by a quarter of a period, and the two signals are orthogonal in frequency domain. In the two optical paths, two data modulators (for example, IQMs) are separately disposed, and data modulation is separately performed on the two signals. The modulated optical signals have a same spectrum. Then, the two signals are combined by using a combiner. In the foregoing solution, there is no need to separately delay a plurality of signals, and it only needs to ensure that each two signals have a delay of a quarter of a period of the spread optical signal.

Embodiments of this application provide an optical transmitter, an optical receiver, and an optical transmission method to which the foregoing solution is applied, to resolve a prior-art problem of high complexity. The method and the apparatus are based on a same inventive concept. Because problem-resolving principles of the method and the apparatus are similar, apparatus implementation and method implementation may be mutually referenced. Repeated parts are not described.

It should be noted that, "a plurality of" described in this application means two or more.

A substantial difference a between A and B in the embodiments of this application means that the difference between A and B is entirely a, or that the difference between A and B falls within a range [a−b, a+b], where b is an allowable error value in a system design, and therefore, it may also be understood that the difference between A and B is a.

In addition, it should be understood that in the description of this application, words "first", "second", and the like are merely used for distinction description, and shall not be understood as an indication or implication of relative importance or an indication or implication of an order.

The embodiments of this application are described below in detail with reference to the accompanying drawings.

Figure 2B:
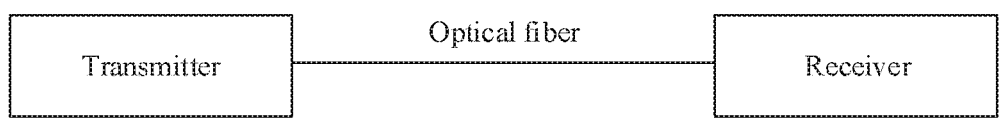
FIG. 2B is a schematic diagram of an optical communications system according to an embodiment of this application.

An embodiment of this application provides an optical communications system. As shown in FIG. 2B, the system includes an optical transmitter and an optical receiver. The optical transmitter is configured to modulate data to an optical signal, and send the optical signal. The optical receiver is configured to: receive the optical signal, and obtain original data through demodulation.

Figure 3:
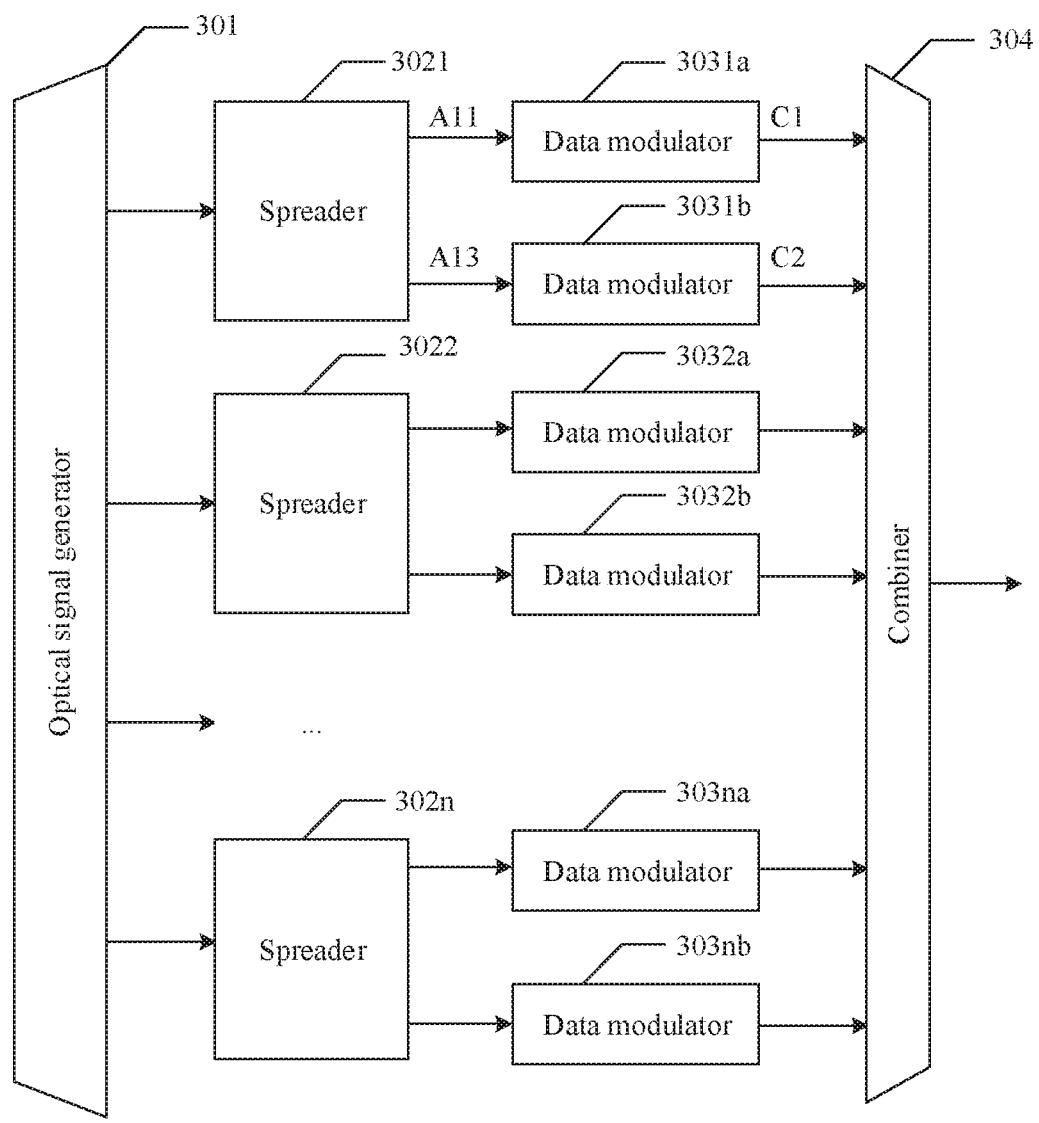
FIG. 3 is a schematic structural diagram of an optical transmitter according to Embodiment 1 of this application.

FIG. 3 is a schematic structural diagram of an optical transmitter according to Embodiment 1 of this application.

The optical transmitter includes an optical signal generator 301, N spreaders which are a spreader 3021, . . . , and a spreader 302n, N pairs of data modulators which are a data modulator pair 3031 (including a data modulator 3031a and a data modulator 3031b), . . . , and a data modulator pair 303n (including a data modulator 303na and a data modulator 303nb), and a combiner 304. N is a positive integer, and N may be specifically set as required.

One spreader corresponds to one pair of data modulators, that is, one spreader is optically connected to one pair of data modulators. For example, the spreader 3021 is optically connected to the data modulator pair 3031.

The optical signal generator 301 is configured to: generate N optical carriers with a single wavelength, and transmit the N optical carriers to the N spreaders. The optical signal generator 301 may include N lasers. Wavelengths of optical signals generated by the N lasers are the same. Alternatively, the optical signal generator 301 may include a laser and an optical divider, or may be another component configured to generate N optical carriers with a single wavelength. The following description is given by using an optical path of the spreader 3021 as an example. For other optical paths, refer to the optical path of the spreader 3021, and details are not described again.

The spreader 3021 is configured to: spread a received optical carrier sent by the optical signal generator 301, to obtain a spread optical signal having two subcarriers, where frequencies of spread optical signals generated by different spreaders 302 are different. As shown in FIG. 3, spread optical signals generated by the N spreaders are A1, A2, . . . , and An. The spread optical signal generated by the spreader 3021 is A1.

The spreader 3021 is further configured to: split the spread optical signal A1 into two signals, where the two signals are an optical signal A11 and an optical signal A12; and delay the optical signal A12 to obtain an optical signal A13. The spreader 3021 transmits the optical signal A11 to the data modulator 3031a and transmits the optical signal A13 to the data modulator 3031b.

The data modulator pair 3031 (the data modulator 3031a and the data modulator 3031b) is configured to: modulate the optical signal A11 and the optical signal A13 that are obtained by the spreader 3021 through processing, to obtain a pair of modulated optical signals: C2 and C1, and then transmit the pair of modulated optical signals (C2 and C1) to the combiner. Therefore, the combiner 304 receives N pairs of modulated optical signals sent by the N pairs of data modulators.

The combiner 304 is configured to: combine, into one optical signal, the N pairs of modulated optical signals transmitted by the N pairs of data modulators, and send the optical signal.

C2 and C1 reaching the combiner differ by $1/(4f_{s1})$ in time domain, where $f_{s1}$ represents a spreading frequency of the spreader 3021. When optical path lengths from the optical signal A11 and the optical signal A12 that are generated by the spreader 3021 to the combiner 304 are equal, the optical signal A12 is delayed to obtain the optical signal A13. When duration of the delay is equal to $1/(4\ f_{s1})$, the two signals, C2 and C1, reaching the combiner 304 differ by $1/(4\ f_{s1})$ in time domain.

Figure 3A:
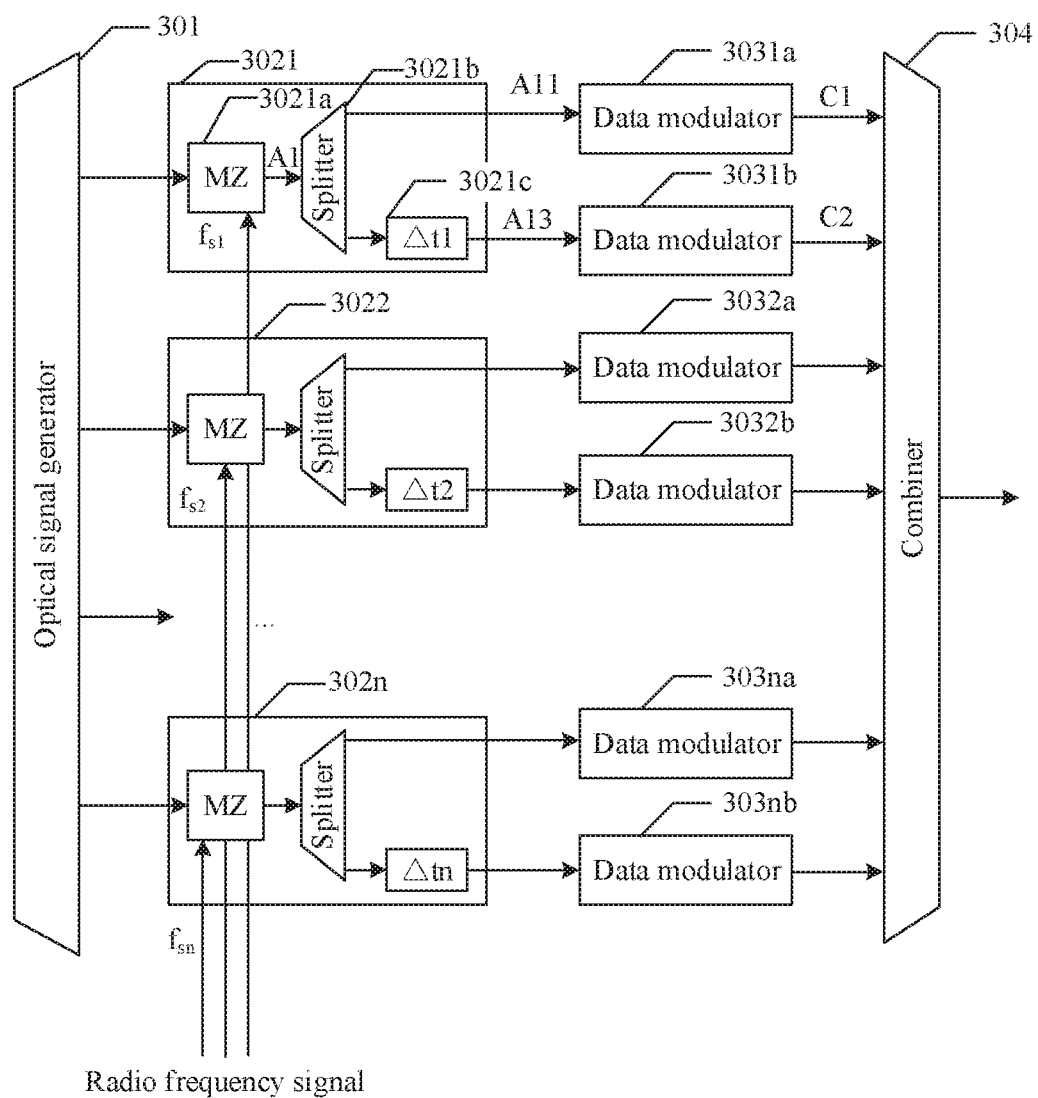
FIG. 3A is a schematic structural diagram of another optical transmitter according to Embodiment 1 of this application.

In a possible implementation, each spreader may include a spread spectrum modulator, a splitter, and a delayer. The spread spectrum modulator may be a Mach-Zehnder modulator MZ. The following description is given by using the spreader 3021 as an example. As shown in FIG. 3A, the spreader 3021 includes an MZ 3021a, a splitter 3021b, and a delayer 3021c.

The MZ 3021a is configured to spread a received optical carrier by using a radio frequency signal, to obtain the spread optical signal A1 having two subcarriers, where a frequency spacing of the two subcarriers of the spread optical signal A1 is twice a frequency of the used radio frequency signal. Frequencies of radio frequency signals used by MZs included in different spreaders are different, and frequencies of radio frequency signals used by N spreaders (a spreader 3021, a spreader 3022, . . . , and a spreader 302n) are $f_{s1}, f_{s2}, \ldots,$ and $f_{sn}$. That is, spreading frequencies of the N spreaders are $f_{s1}, f_{s2}, \ldots,$ and $f_{sn}$.

The splitter 3021b is configured to split the spread optical signal A1 into an optical signal A11 and an optical signal A12.

The delayer 3021c is configured to delay the optical signal A12 to obtain A13.

Figure 3B:
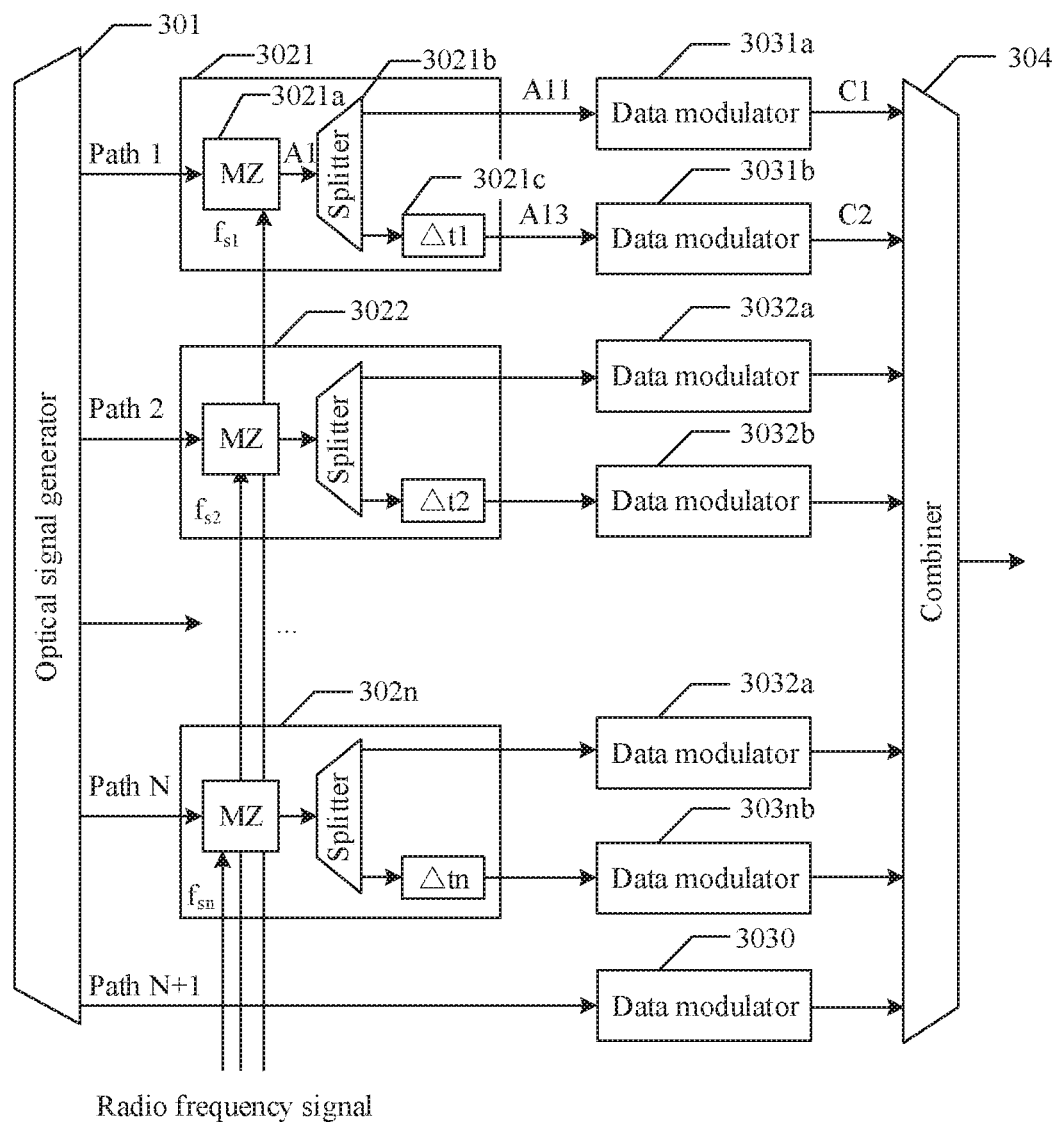
FIG. 3B is a schematic structural diagram of another optical transmitter according to Embodiment 1 of this application.

The spread spectrum modulator may further have a light splitting function, and therefore, the spreader does not include the splitter, that is, the spreader includes only the spread spectrum modulator and the delayer. For example, using the spreader 3021 as an example, as shown in FIG. 3B, the spreader 3021 includes an MZ 3021d and a delayer 3021f.

The MZ 3021d is configured to: spread, by using a radio frequency signal, a received optical carrier to obtain a spread optical signal having two subcarriers, and split the spread optical signal into an optical signal A11 and an optical signal A12, so that optical signals emitted from the MZ 3021d are A11 and A12.

The delayer 3021f is configured to delay the optical signal A12 to obtain an optical signal A13.

It should be noted that, based on an actual system capacity requirement, a quantity of optical paths on which code division multiplexing is performed by the optical transmitter may be an odd number or an even number. In FIG. 3 and FIG. 3A, the quantity of optical paths is an even number. When the quantity of optical paths used by the optical transmitter for code division multiplexing is an odd number, 2*N−1 optical paths may be selected from 2*N optical paths as required. For example, if an actual system capacity requires three optical paths, the optical transmitter shown in FIG. 3 or FIG. 3A may be designed, where N is 2, and the combiner is designed to receive three signals. When the quantity of optical paths used by the optical transmitter for code division multiplexing is an odd number, one optical carrier may alternatively not be spread. For example, as shown in FIG. 3B, in addition to the N pairs of data modulators, the optical transmitters shown in FIG. 3 and FIG. 3A further includes a data modulator 3030.

The optical signal generator 301 is further configured to: generate an $(N+1)^{th}$ optical carrier with the single wavelength, and transmit the $(N+1)^{th}$ optical carrier with the single wavelength to the data modulator 3030.

The data modulator 3030 is configured to: perform data modulation on the $(N+1)^{th}$ optical carrier to obtain a modulated optical signal Cn, and transmit the modulated optical signal Cn to the combiner 304.

The combiner 304 is specifically configured to: combine, into one optical signal, the N pairs of modulated optical signals transmitted by the N pairs of data modulators and the modulated optical signal Cn transmitted by the data modulator 3030, and send the optical signal.

The spread spectrum modulator may be an MZ, or may be a microring resonant cavity MR.

Figure 4:
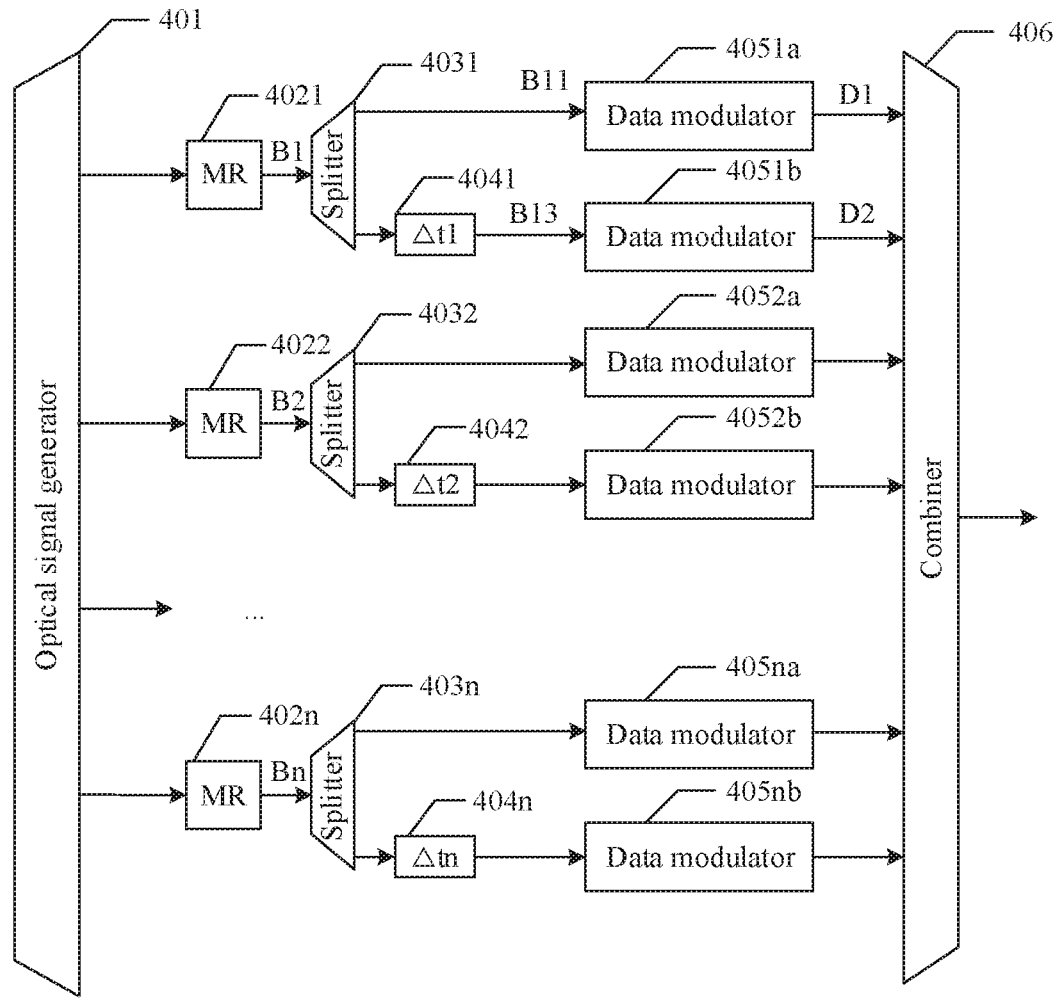
FIG. 4 is a schematic structural diagram of an optical transmitter according to Embodiment 2 of this application.

When the spread spectrum modulator is a microring resonant cavity MR, FIG. 4 is a schematic structural diagram of an optical transmitter according to Embodiment 2 of this application.

The optical transmitter includes an optical signal generator 401, N MRs which are an MR 4021, . . . , and an MR 402n, N splitters which are a splitter 4031, . . . , and a splitter 403n, N delayers which are a delayer 4041, . . . , and a delayer 404n, N pairs of data modulators which are a data modulator pair 4051 (including a data modulator 4051a and a data modulator 4051b), . . . , and a data modulator pair 405n (including a data modulator 405na and a data modulator 405nb), and a combiner 406. N is a positive integer, and N may be specifically set as actually required.

One MR corresponds to one data modulator pair. One MR is split into two paths. One path is optically connected to one data modulator in the data modulator pair, and the other path is optically connected to the other data modulator in the data modulator pair by using one delayer. For example, in the MR 4021, one path is connected to the data modulator 4051a, and the other path is connected to the data modulator 4051b by using the delayer 4041.

The optical signal generator 401 is configured to: generate N optical carriers with a single wavelength, and transmit the N optical carriers to N spreaders. The optical signal generator 401 may include N lasers. Alternatively, the optical signal generator 401 may include a laser and an optical divider, or another component configured to generate N optical carriers with a single wavelength. The following description is given by using the optical the MR 4021 as an example. For other optical paths, refer to the optical the MR 4021, and details are not described again.

The MR 4021 is configured to spread a received optical carrier sent by the optical signal generator 401, to obtain the spread optical signal having two subcarriers, where frequencies of spread optical signals generated by different spreaders 402 are different, that is, spreading frequencies of different spreaders 402 are different. For example, spreading frequencies of the N MRs may be $f_{s1}, f_{s2}, \ldots,$ and $f_{sn}$.

As shown in FIG. 4, spread optical signals generated by the N MRs are B1, B2, . . . , and Bn. The spread optical signal generated by the delayer 4021 is B1.

The splitter 4031 is configured to: split the spread optical signal B1 into an optical signal B11 and an optical signal B12, transmit the optical signal B11 to the data modulator 4051a, and transmit the optical signal B12 to the delayer 4041.

The delayer 4041 is configured to: delay the optical signal B12 to obtain an optical signal B13, and transmit the optical signal B13 to the data modulator 4051b.

The data modulator 4051a is configured to modulate the optical signal B11 to obtain a modulated optical signal D1, and transmit the modulated optical signal D1 to the combiner 406. The data modulator 4051b is configured to modulate the optical signal B13 to obtain a modulated optical signal D2, and transmit the modulated optical signal D2 to the combiner 406. The modulated optical signal D1 and the modulated optical signal D2 are a pair of modulated optical signals. Therefore, the combiner 406 receives N pairs of modulated optical signals sent by the N pairs of data modulators.

The combiner 406 is configured to: combine, into one optical signal, the N pairs of modulated optical signals transmitted by the N pairs of data modulators, and send the optical signal.

The pair of modulated optical signals reaching the combiner 406 differ by a quarter of a spreading period of a corresponding MR in time domain. For example, D2 and D1 reaching the combiner differ by $1/(4 f_{s1})$ in time domain. A spreading period is equal to a reciprocal of a spreading frequency $f_{s1}$ of an MR. When optical path lengths from the optical signal B11 and the optical signal B12 that are generated by the spreader 4021 to the combiner 406 are equal, the optical signal B12 is delayed to obtain the optical signal B13. When duration of the delay is equal to $1/(4 f_{s1})$, the two signals, D2 and D1, reaching the combiner 406 differ by $1/(4 f_{s1})$ in time domain.

Figure 4A:
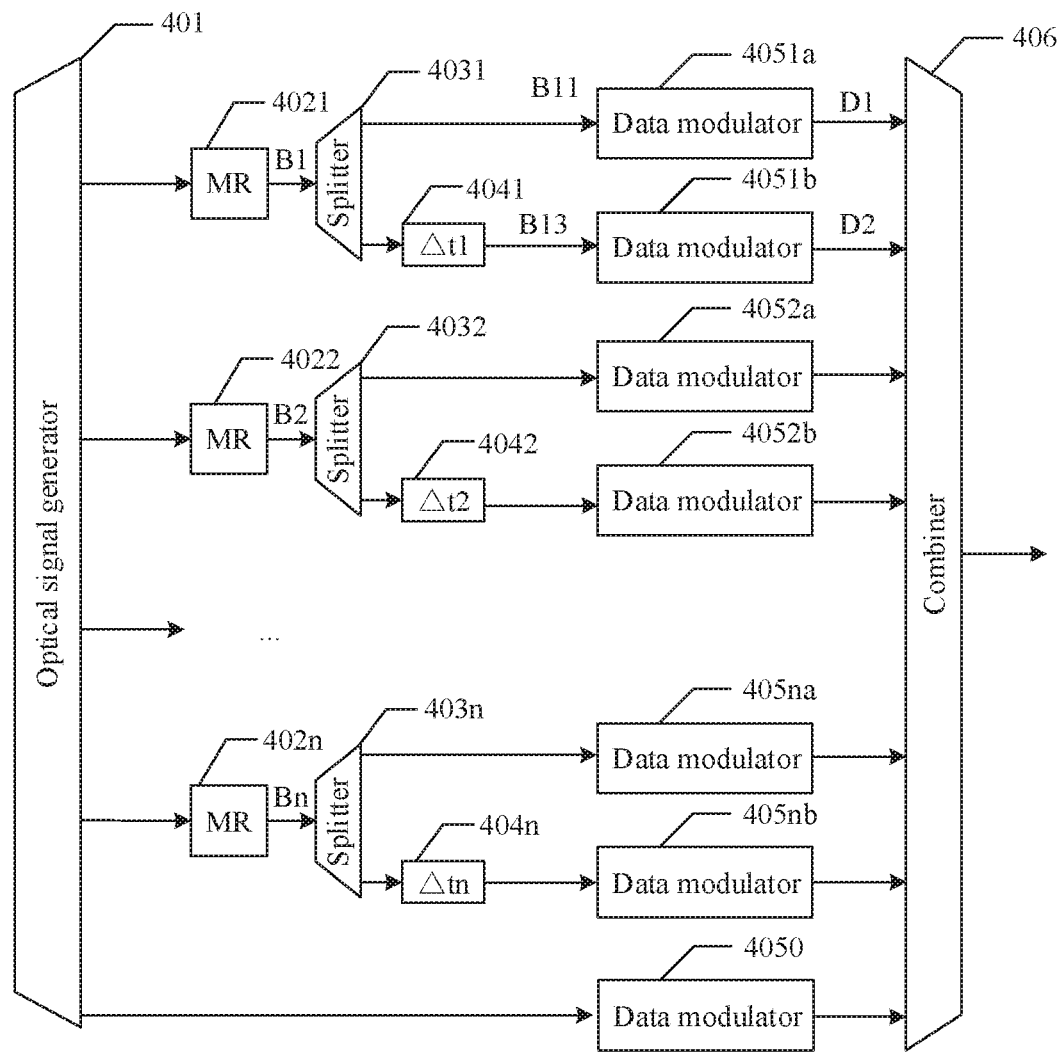
FIG. 4A is a schematic structural diagram of another optical transmitter according to Embodiment 2 of this application.

It should be noted that, based on an actual system capacity requirement, a quantity of optical paths on which code division multiplexing is performed by the optical transmitter may be an odd number or an even number. In FIG. 4, the quantity of optical paths is an even number. When the quantity of optical paths used by the optical transmitter for code division multiplexing is an odd number, 2*N−1 optical paths may be selected from 2*N optical paths as required. For example, if an actual system capacity requires three optical paths, the optical transmitter shown in FIG. 4 may be designed, where N is 2, and the combiner is designed to receive three signals. When the quantity of optical paths used by the optical transmitter for code division multiplexing is an odd number, one optical carrier may alternatively not be spread. For example, as shown in FIG. 4A, in addition to the N pairs of data modulators, the optical transmitter shown in FIG. 4 further includes a data modulator 4050.

The optical signal generator 401 is further configured to: generate an $(N+1)^{th}$ optical carrier with the single wavelength, and transmit the $(N+1)^{th}$ optical carrier with the single wavelength to the data modulator 4050.

The data modulator 4050 is configured to: perform data modulation on the $(N+1)^{th}$ optical carrier to obtain a modulated optical signal Dn, and transmit the modulated optical signal Dn to the combiner 406.

The combiner 406 is specifically configured to: combine, into one optical signal, the N pairs of modulated optical signals transmitted by the N pairs of data modulators and the modulated optical signal Dn transmitted by the data modulator 4050, and send the optical signal.

Figure 4B:
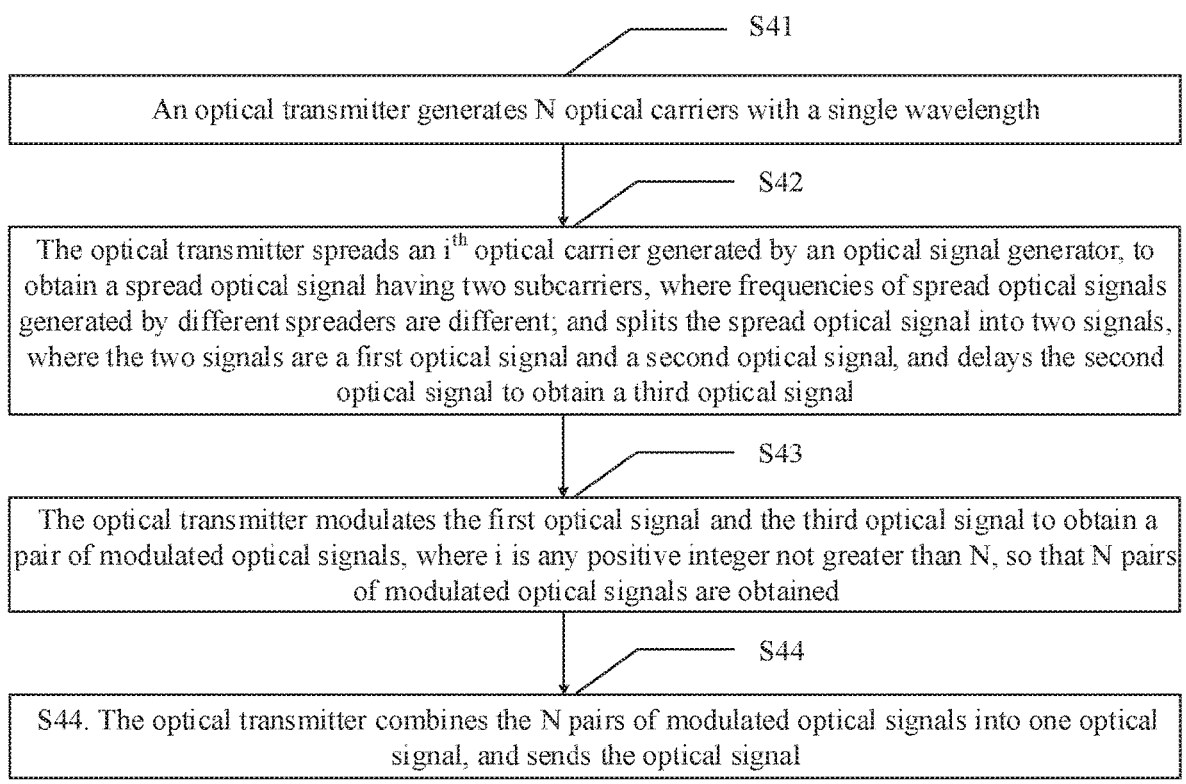
FIG. 4B is a flowchart of an optical transmission method according to an embodiment of this application.

Based on an inventive concept the same as that of the embodiments corresponding to FIG. 3 and FIG. 3A, or FIG. 4 and FIG. 4A, an embodiment of this application further provides an optical transmission method. As shown in FIG. 4B, the method is specifically implemented by an optical transmitter, and the method includes the following steps.

S41. The optical transmitter generates N optical carriers with a single wavelength.

S42. The optical transmitter spreads an $i^{th}$ optical carrier generated by an optical signal generator, to obtain a spread optical signal having two subcarriers, where frequencies of spread optical signals generated by different spreaders are different; and splits the spread optical signal into two signals, where the two signals are a first optical signal and a second optical signal, and delays the second optical signal to obtain a third optical signal.

S43. The optical transmitter modulates the first optical signal and the third optical signal to obtain a pair of modulated optical signals, where i is any positive integer not greater than N, so that N pairs of modulated optical signals are obtained.

S44. The optical transmitter combines the N pairs of modulated optical signals into one optical signal, and sends the optical signal.

In the combined N pairs of modulated optical signals, an $i^{th}$ pair of modulated optical signals differ, in time domain, by a quarter of a period of an $i^{th}$ spread optical signal for modulation.

Optionally, when generating the N optical carriers with the single wavelength, the optical transmitter further generates an $(N+1)^1$ optical carrier with the single wavelength, and before combining the N pairs of modulated optical signals into one optical signal, the optical transmitter performs data modulation on the $(N+1)^{th}$ optical carrier with the single wavelength, to obtain a first modulated optical signal.

The combining, by the optical transmitter, the N pairs of modulated optical signals into one optical signal includes:

combining, by the optical transmitter, the N pairs of modulated optical signals and the first modulated optical signal into one optical signal.

Figure 5:
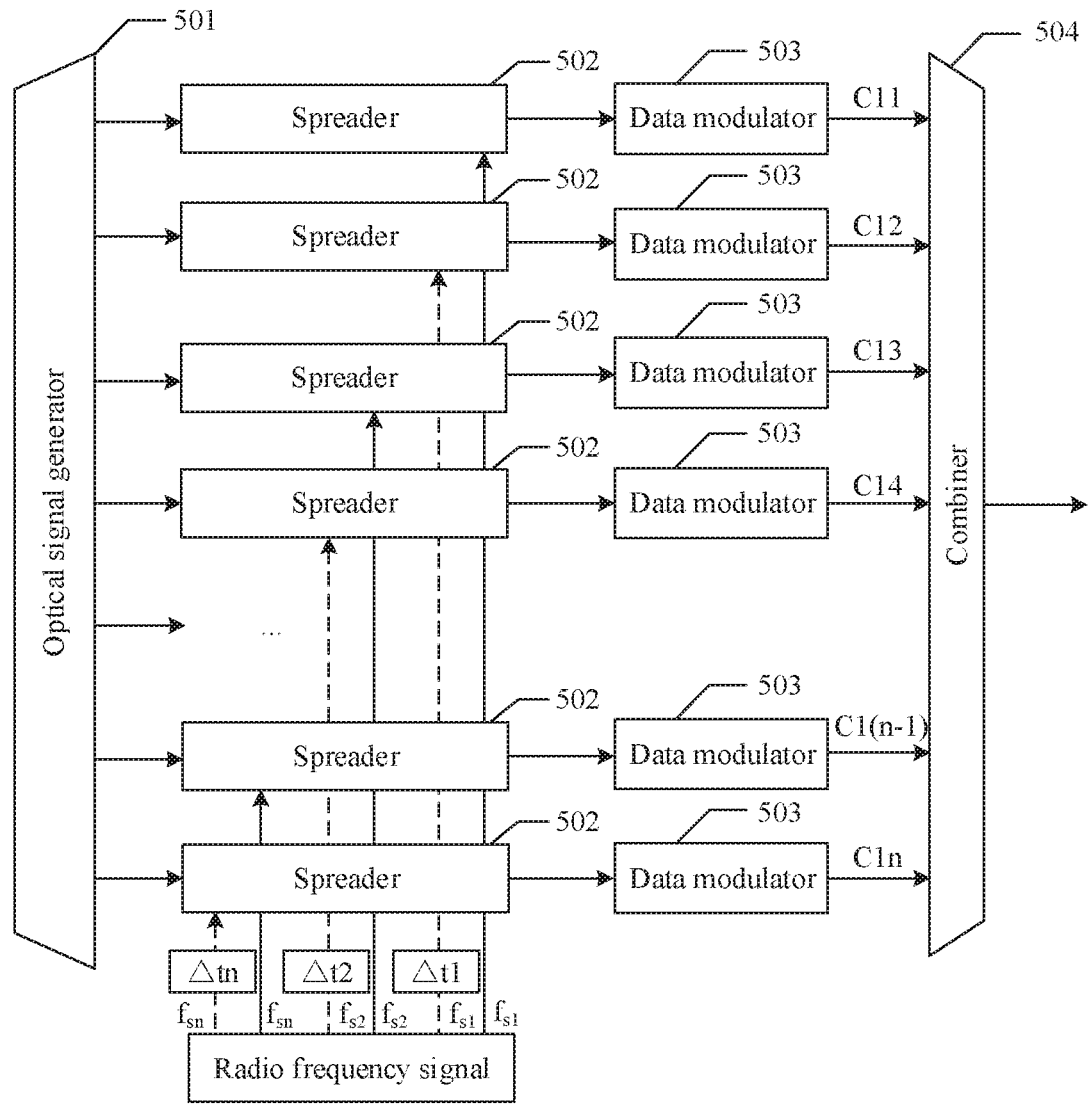
FIG. 5 is a schematic structural diagram of an optical transmitter according to Embodiment 3 of this application.

FIG. 5 is a schematic structural diagram of an optical transmitter according to Embodiment 3 of this application.

The optical transmitter includes an optical signal generator 501, N/2 pairs of spreaders 502, N/2 pairs of data modulators 503, and a combiner 504, where N is an even number, and N may be set based on a system requirement.

The optical signal generator 501 is configured to: generate N optical carriers with a single wavelength, and transmit each optical carrier to a corresponding spreader. The optical signal generator 501 is configured to: generate N optical carriers with a single wavelength, and transmit the N optical carriers to N spreaders. The optical signal generator 501 may include N lasers. Alternatively, the optical signal generator 501 may include a laser and an optical divider, or may include another component configured to generate N optical carriers with a single wavelength.

Each pair of spreaders 502 are configured to: spread, by using corresponding radio frequency signals, two corresponding optical carriers to obtain a pair of spread optical signals having two subcarriers, and transmit the pair of spread optical signals to corresponding data modulators, where frequencies of the radio frequency signals used by each pair of spreaders are equal, and frequencies of radio frequency signals used by any two pairs of spreaders are not equal. Frequencies of radio frequency signals used by the N/2 pairs of spreaders are $f_{s1}, f_{s2}, \ldots,$ and $f_{sn}$, where n=N/2, that is, spreading frequencies of the N/2 pairs of spreaders are $f_{s1}, f_{s2}, \ldots,$ and $f_{sn}$.

Each pair of data modulators 503 perform, by using a pair of received spread optical signals, data modulation to obtain a pair of modulated optical signals, and transmit the pair of modulated optical signals to the combiner 504. The spreader may be an MZ, or another device that can perform spreading by using a radio frequency signal.

The combiner 504 is configured to: combine, into one optical signal, N/2 pairs of modulated optical signals transmitted by the N/2 pairs of data modulators, and send the optical signal. As shown in FIG. 5, the N/2 pairs of modulated optical signals sent by the N/2 pairs of data modulators are C11, C12, . . . , C1(n−1), and C1n, where n=N.

The radio frequency signals used by each pair of spreaders form a pair, and each pair of radio frequency signals differ by a preset time length in time domain, so that a pair of modulated optical signals reaching the combiner differ by a quarter of a period of the used radio frequency signals in time domain. For example, if C11 and C12 are a pair of modulated optical signals reaching the combiner, C11 and C12 differ by a quarter of a period of the used radio frequency signals whose frequency is f in time domain, that is, $1/(4\ f_{s1})$. A pair of radio frequency signals with a same frequency may be implemented by delaying one signal by using a radio frequency signal corresponding to the frequency. For example, one radio frequency signal in a pair of radio frequency signals whose frequency is $f_{s1}$ is delayed, and when optical path lengths from two signals generated by a pair of spreaders 502 to the combiner 506 are equal, specifically, one radio frequency signal in the pair of radio frequency signals whose frequency is $f_{s1}$ may be delayed by a quarter of a period of the radio frequency signal, that is, delayed by $1/(4\ f_{s1})$, as shown in FIG. 5.

Figure 5A:
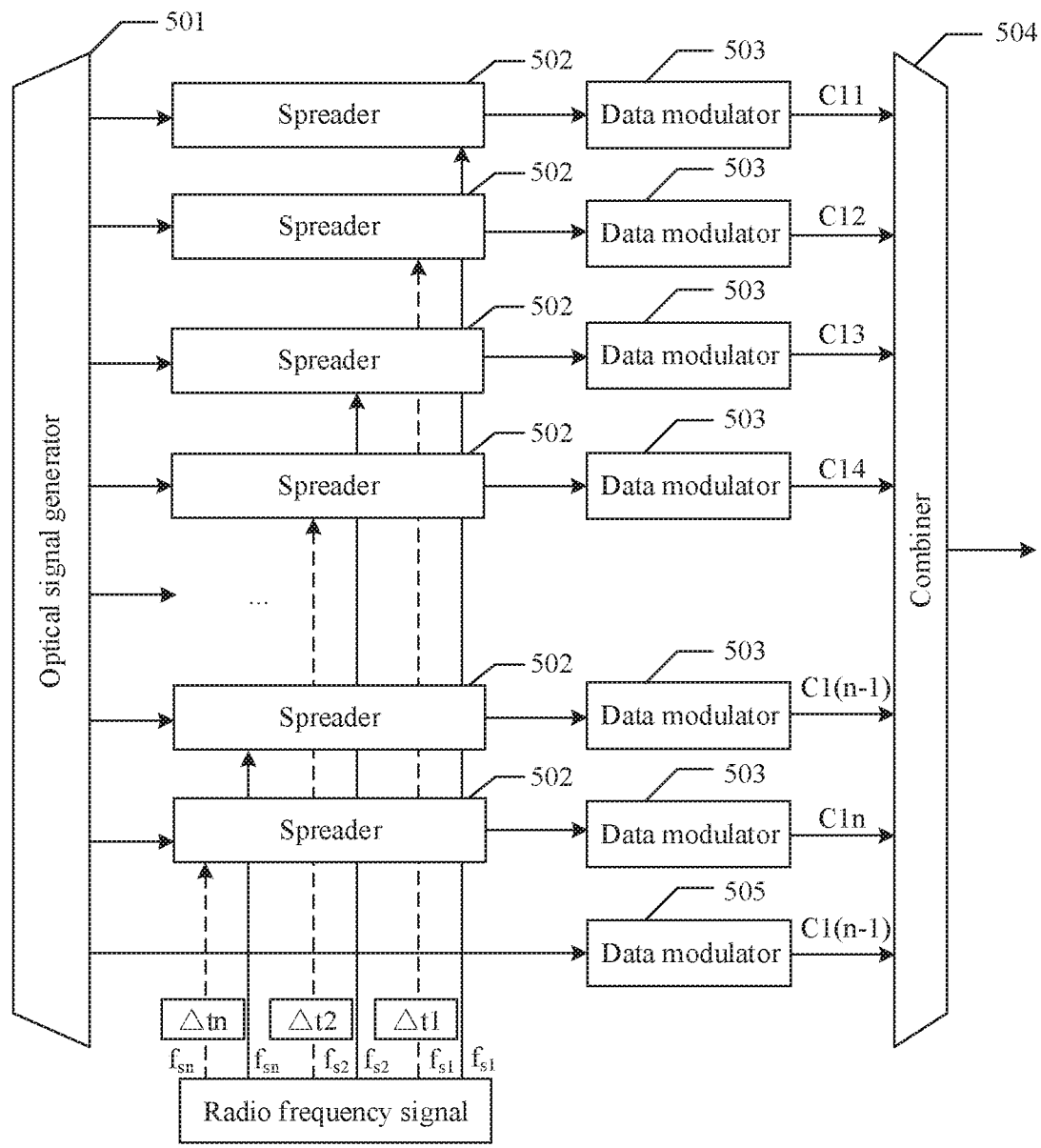
FIG. 5A is a schematic structural diagram of another optical transmitter according to Embodiment 3 of this application.

It should be noted that, based on an actual system capacity requirement, a quantity of optical paths on which code division multiplexing is performed by the optical transmitter may be an odd number or an even number. In FIG. 5, the quantity of optical paths is an even number. When the quantity of optical paths used by the optical transmitter for code division multiplexing is an odd number, N−1 optical paths may be selected from N optical paths as required. For example, if an actual system capacity requires three optical paths, the optical transmitter shown in FIG. 5 may be designed, where N is 4, and the combiner is designed to receive three signals. When the quantity of optical paths used by the optical transmitter for code division multiplexing is an odd number, one optical carrier may alternatively not be spread. For example, as shown in FIG. 5A, in addition to the N/2 pairs of data modulators, the optical transmitter shown in FIG. 5 further includes a data modulator. To distinguish from the N/2 pairs of data modulators, the data modulator is referred to as a data modulator 505.

The optical signal generator 501 is further configured to: generate an $(N+1)^{th}$ optical carrier with the single wavelength, and transmit the $(N+1)^{th}$ optical carrier with the single wavelength to the data modulator 505.

The data modulator 505 is configured to: perform data modulation on the $(N+1)^{th}$ optical carrier to obtain a modulated optical signal, and transmit the modulated optical signal to the combiner 504.

The combiner 504 is specifically configured to: combine, into one optical signal, the N pairs of modulated optical signals transmitted by the N pairs of data modulators 503 and the modulated optical signal $C1(n+1)$ transmitted by the data modulator 505, and send the optical signal.

Figure 5B:
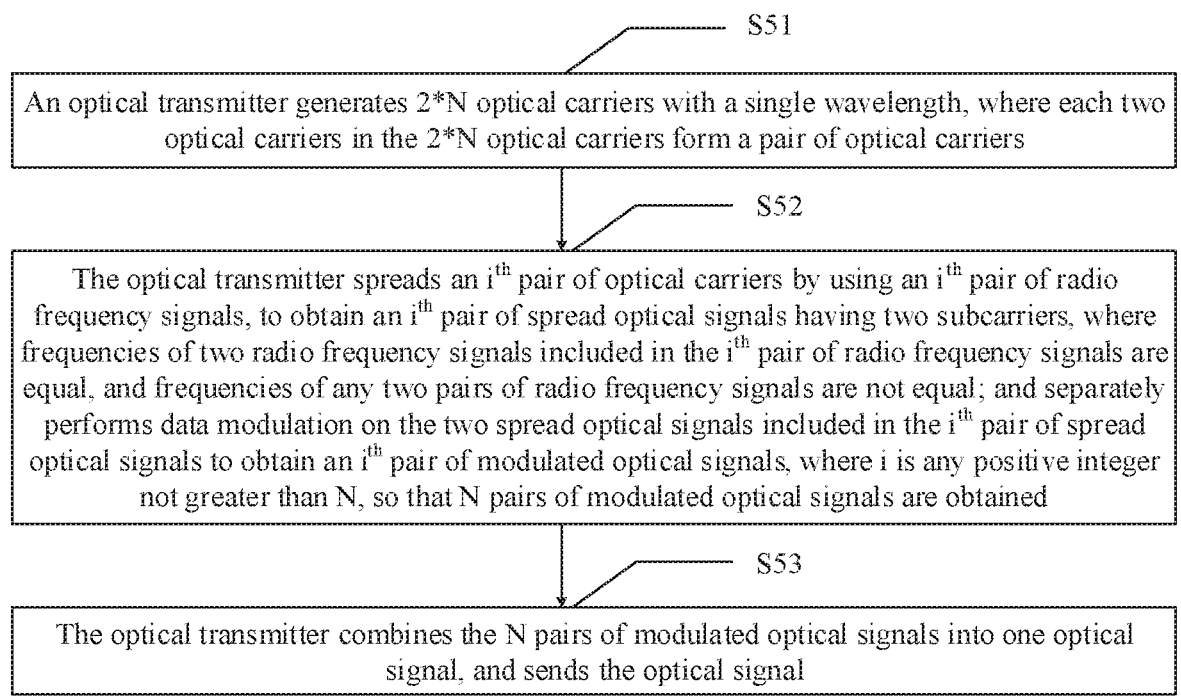
FIG. 5B is a flowchart of an optical transmission method according to an embodiment of this application.

Based on an inventive concept the same as that of the embodiments corresponding to FIG. 5 and FIG. 5A, an embodiment of this application further provides an optical transmission method. As shown in FIG. 5B, the method is specifically implemented by an optical transmitter, and the method includes the following steps.

S51. The optical transmitter generates 2*N optical carriers with a single wavelength, where each two optical carriers in the 2*N optical carriers form a pair of optical carriers.

S52. The optical transmitter spreads an $i^{th}$ pair of optical carriers by using an $i^{th}$ pair of radio frequency signals, to obtain an $i^{th}$ pair of spread optical signals having two subcarriers, where frequencies of two radio frequency signals included in the $i^{th}$ pair of radio frequency signals are equal, and frequencies of any two pairs of radio frequency signals are not equal; and separately performs data modulation on the two spread optical signals included in the $i^{th}$ pair of spread optical signals to obtain an $i^{th}$ pair of modulated optical signals, where i is any positive integer not greater than N, so that N pairs of modulated optical signals are obtained.

S53. The optical transmitter combines the N pairs of modulated optical signals into one optical signal, and sends the optical signal.

The $i^{th}$ pair of radio frequency signals differ by a preset time length in time domain, so that the $i^{th}$ pair of modulated optical signals for combining differ by a quarter of a period of the $i^{th}$ pair of radio frequency signals in time domain.

Optionally, when generating the 2*N optical carriers with the single wavelength, the optical transmitter further generates an $(2*N+1)^{th}$ optical carrier with the single wavelength, and before combining the N pairs of modulated optical signals into one optical signal, the optical transmitter performs data modulation on the $(2*N+1)^{th}$ optical carrier with the single wavelength, to obtain a first modulated optical signal.

The combining, by the optical transmitter, the N pairs of modulated optical signals into one optical signal includes: combining, by the optical transmitter, the N pairs of modulated optical signals and the first modulated optical signal into one optical signal.

Figure 6:
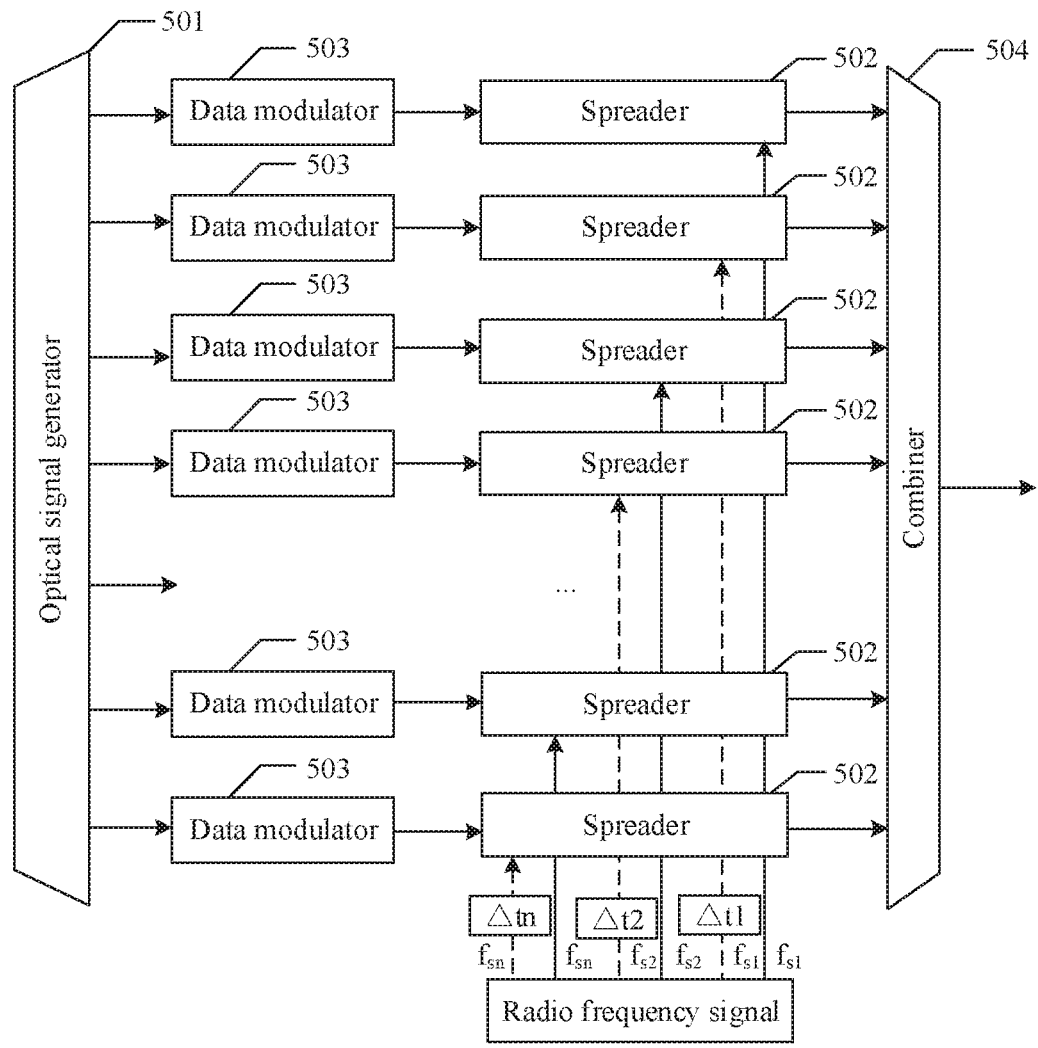
FIG. 6 is a schematic structural diagram of an optical transmitter according to Embodiment 4 of this application.
Figure 6A:
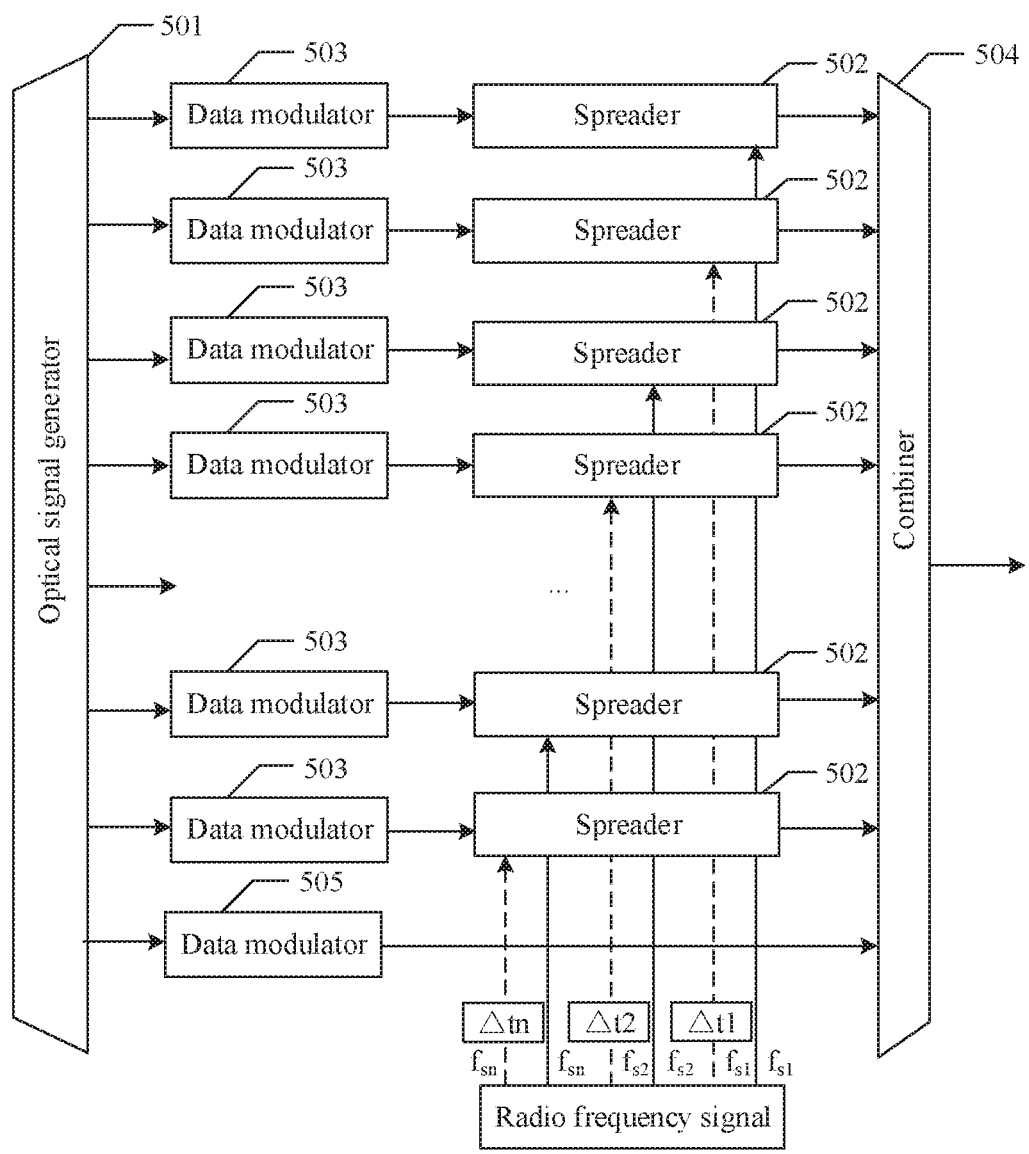
FIG. 6A is a schematic structural diagram of another optical transmitter according to Embodiment 4 of this application.

FIG. 6 and FIG. 6A are schematic structural diagrams of an optical transmitter according to Embodiment 4 of this application. A difference between Embodiment 4 and Embodiment 3 lies in: The optical transmitter in Embodiment 3 includes an optical signal generator 501, a spreader 502, a data modulator 503, and a combiner 504 according to an optical transmission sequence. That is, the spreader 502 first spreads an optical carrier generated by the optical signal generator 501, and then the data modulator 503 performs data modulation on a spread optical signal. The optical transmitter in Embodiment 4 includes an optical signal generator 501, a data modulator 503, a spreader, and a combiner 504 according to an optical transmission sequence. That is, the data modulator 503 first performs data modulation on an optical carrier generated by the optical signal generator 501, and then the spreader 502 spreads a modulated optical signal obtained after the data modulation. For other processing manners, refer to the description of Embodiment 3. Details are not described herein again.

Figure 6B:
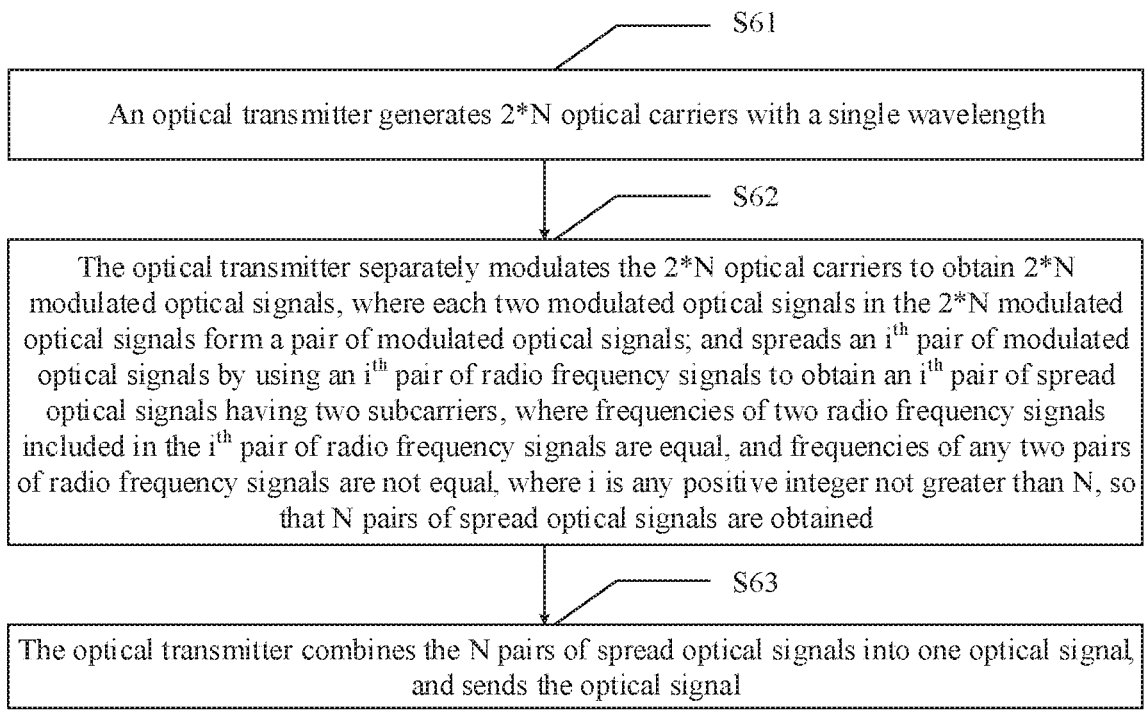
FIG. 6B is a flowchart of an optical transmission method according to an embodiment of this application.

Based on an inventive concept the same as that of the embodiments corresponding to FIG. 6 and FIG. 6A, an embodiment of this application further provides an optical transmission method. As shown in FIG. 6B, the method is specifically implemented by an optical transmitter, and the method includes the following steps.

S61. The optical transmitter generates 2*N optical carriers with a single wavelength.

S62. The optical transmitter separately modulates the 2*N optical carriers to obtain 2*N modulated optical signals, where each two modulated optical signals in the 2*N modulated optical signals form a pair of modulated optical signals; and spreads an $i^{th}$ pair of modulated optical signals by using an $i^{th}$ pair of radio frequency signals to obtain an $i^{th}$ pair of spread optical signals having two subcarriers, where frequencies of two radio frequency signals included in the $i^{th}$ pair of radio frequency signals are equal, and frequencies of any two pairs of radio frequency signals are not equal, where i is any positive integer not greater than N, so that N pairs of spread optical signals are obtained.

S63. The optical transmitter combines the N pairs of spread optical signals into one optical signal, and sends the optical signal.

The $i^{th}$ pair of radio frequency signals differ by a preset time length in time domain, so that an $i^{th}$ pair of spread optical signals for combining differ by a quarter of a period of the i$^{th}$ pair of radio frequency signals in time domain.

Optionally, when generating the 2*N optical carriers with the single wavelength, the optical transmitter further generates an (2*N+1)$^{th}$ optical carrier with the single wavelength, and before combining the N pairs of modulated optical signals into one optical signal, the optical transmitter performs data modulation on the (2*N+1)$^{th}$ optical carrier with the single wavelength, to obtain a first modulated optical signal.

The combining, by the optical transmitter, the N pairs of modulated optical signals into one optical signal includes:

combining, by the optical transmitter, the N pairs of modulated optical signals and the first modulated optical signal into one optical signal.

Figure 7:
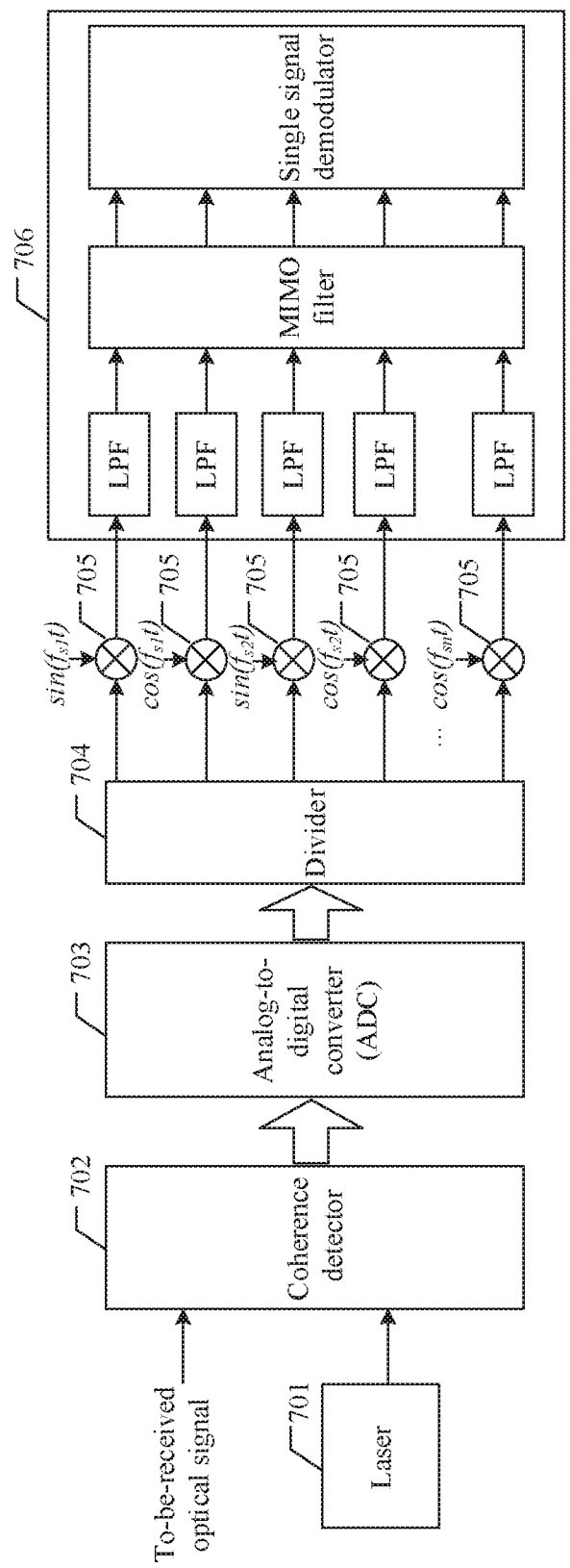
FIG. 7 is a schematic structural diagram of an optical receiver according to Embodiment 5 of this application.

FIG. 7 is a schematic structural diagram of an optical receiver according to Embodiment 5 of this application.

A solution used by the optical receiver in Embodiment 5 is as follows: Coherence demodulation is performed on a to-be-received optical signal by using light emitted by a single-wavelength laser as local oscillator light, and then despreading and data demodulation and recovery are performed. The to-be-received optical signal and the single local oscillator light are simultaneously connected to a coherence detector, and then after an analog electrical signal that is output later is converted into a digital signal by an analog-to-digital converter (Analog-to-Digital Converter, ADC), the digital signal enters a digital signal processor for processing. The digital signal processor performs operations such as despreading and filtering, to demultiplex a plurality of signals.

Specifically, the optical receiver includes: a laser 701, a coherence detector 702, an analog-to-digital converter 703, a divider 704, M multipliers 705, and a demodulator 706, where M is equal to a quantity of optical signals combined by a combiner included in an optical transmitter. The optical transmitter may be the optical transmitter described in any one of Embodiment 1 to Embodiment 4. Functions of the M multipliers 705 and the demodulator 706 may be implemented by a digital signal processor DSP.

The laser 701 is configured to generate a local oscillator optical signal. Both a to-be-received optical signal and the local oscillator optical signal enter the coherence detector 702.

The coherence detector 702 performs coherence detection on the to-be-received optical signal from the optical transmitter by using the local oscillator optical signal generated by the laser 701, to obtain an analog electrical signal. The coherence detector 702 may be an integrated coherent receiver (Integrated coherent receiver, ICR). The analog electrical signal output by the coherence detector 702 is transmitted to the analog-to-digital converter 703. The analog-to-digital converter (ADC) 703 converts the analog electrical signal into a digital electrical signal, and transmits the digital electrical signal to the divider 704 for dividing.

The divider 704 is configured to: divide the digital electrical signal into M electrical signals, and transmit the M electrical signals to the M multipliers for frequency shifting in electrical domain. One multiplier corresponds to one electrical signal.

Each multiplier 705 is configured to multiply a corresponding electrical signal by a corresponding spread spectrum signal to obtain a despread electrical signal, so that M despread optical signals are obtained.

The spread spectrum signal multiplied by each electrical signal is a sinusoidal signal or a cosine signal, and frequencies of the spread spectrum signals multiplied by the M electrical signals are in a one-to-one correspondence with and equal to spreading frequencies used for generating, in the optical transmitter, the M optical signals combined by the combiner; and two spread spectrum signals with equal frequencies differ by a quarter of a period in time domain.

The demodulator 706 is configured to demodulate M despread electrical signals to obtain original data corresponding to the optical signal.

For example, when M is an even number, and the optical transmitter has a structure of the optical transmitter described in the embodiment corresponding to FIG. 3, FIG. 3A, FIG. 4, FIG. 5, or FIG. 6, spreading frequencies of the spreaders in the optical transmitter are $f_{s1}$, $f_{s2}$, ..., and $f_{sn}$, that is, spreading frequencies used to generate the M(=2*n) optical signals combined by the combiner are $f_{s1}$, $f_{s1}$, $f_{s2}$, $f_{s2}$, ..., and $f_{sn}$ and $f_{sn}$, and two spread spectrum signals with equal frequencies differ by a quarter of a period in time domain, so that the M spread spectrum signals are $\sin(f_{s1}t)$, $\cos(f_{s1}t)$, $\sin(f_{s2}t)$, $\cos(f_{s2}t)$, ..., $\sin(f_{sn}t)$, and $\cos(f_{sn}t)$, as shown in FIG. 7. When M is an odd number, and one signal in the signals combined by the combiner in the optical transmitter does not participate in spreading, one of the M spread spectrum signals is $\sin(f_{s0}t)$ and $f_{s0}=0$, as shown in FIG. 7A.

The optical receiver may further include M low-pass filters and a multiple-input multiple-output (MIMO) filter. The multiple-input multiple-output (MIMO) filter can be a finite unit impulse response filter (Finite Impulse Response, FIR) filter.

The despread electrical signal output from each multiplier 705 is transmitted to a corresponding low-pass filter for filtering, to filter out a high-frequency signal, and then the M signals obtained after the low-pass filtering is further demultiplexed by using the FIR filter. Then, signal demodulation is performed by using the demodulator 706 to obtain original data through recovery.

Figure 7A:
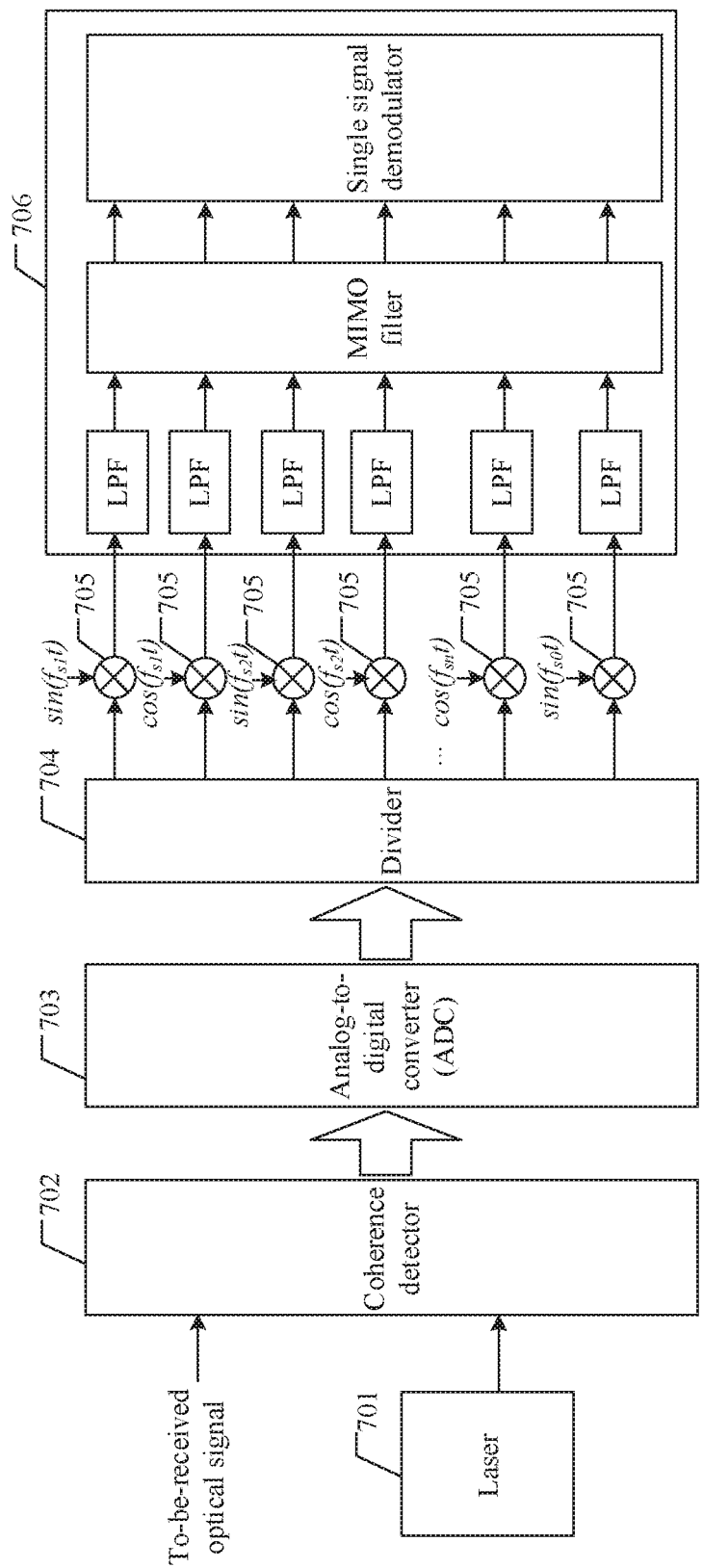
FIG. 7A is a schematic structural diagram of another optical receiver according to Embodiment 5 of this application.
Figure 7B:
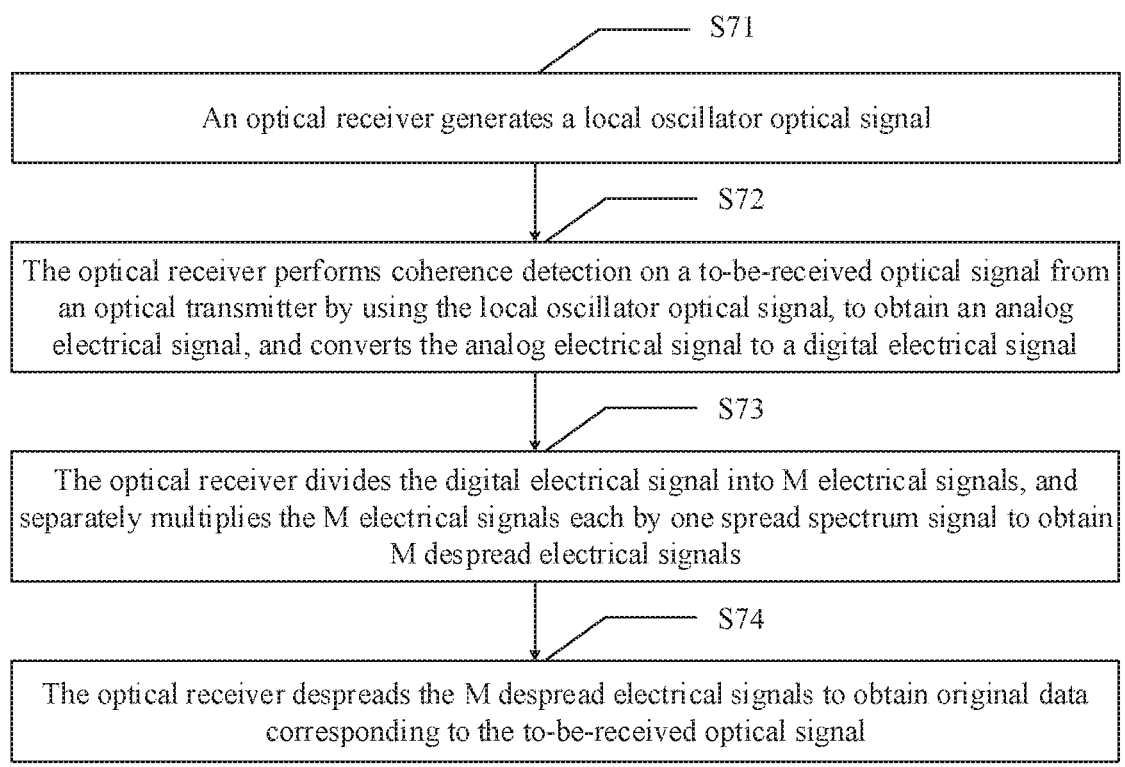
FIG. 7B is a flowchart of an optical transmission method according to an embodiment of this application.

Based on an inventive concept the same as that of the embodiments corresponding to FIG. 7 and FIG. 7A, an embodiment of this application further provides an optical transmission method. As shown in FIG. 7B, the method is specifically implemented by an optical receiver, and the method includes the following steps.

S71. The optical receiver generates a local oscillator optical signal.

S72. The optical receiver performs coherence detection on a to-be-received optical signal from an optical transmitter by using the local oscillator optical signal, to obtain an analog electrical signal, and converts the analog electrical signal to a digital electrical signal.

S73. The optical receiver divides the digital electrical signal into M electrical signals, and separately multiplies the M electrical signals each by one spread spectrum signal to obtain M despread electrical signals.

The spread spectrum signal multiplied by each electrical signal is a sinusoidal signal or a cosine signal, and frequencies of the spread spectrum signals multiplied by the M electrical signals are in a one-to-one correspondence with and equal to frequencies of M optical signals combined by the optical transmitter; and two spread spectrum signals with equal frequencies differ by a quarter of a period in time domain.

S74. The optical receiver despreads the M despread electrical signals to obtain original data corresponding to the to-be-received optical signal.

Figure 8:
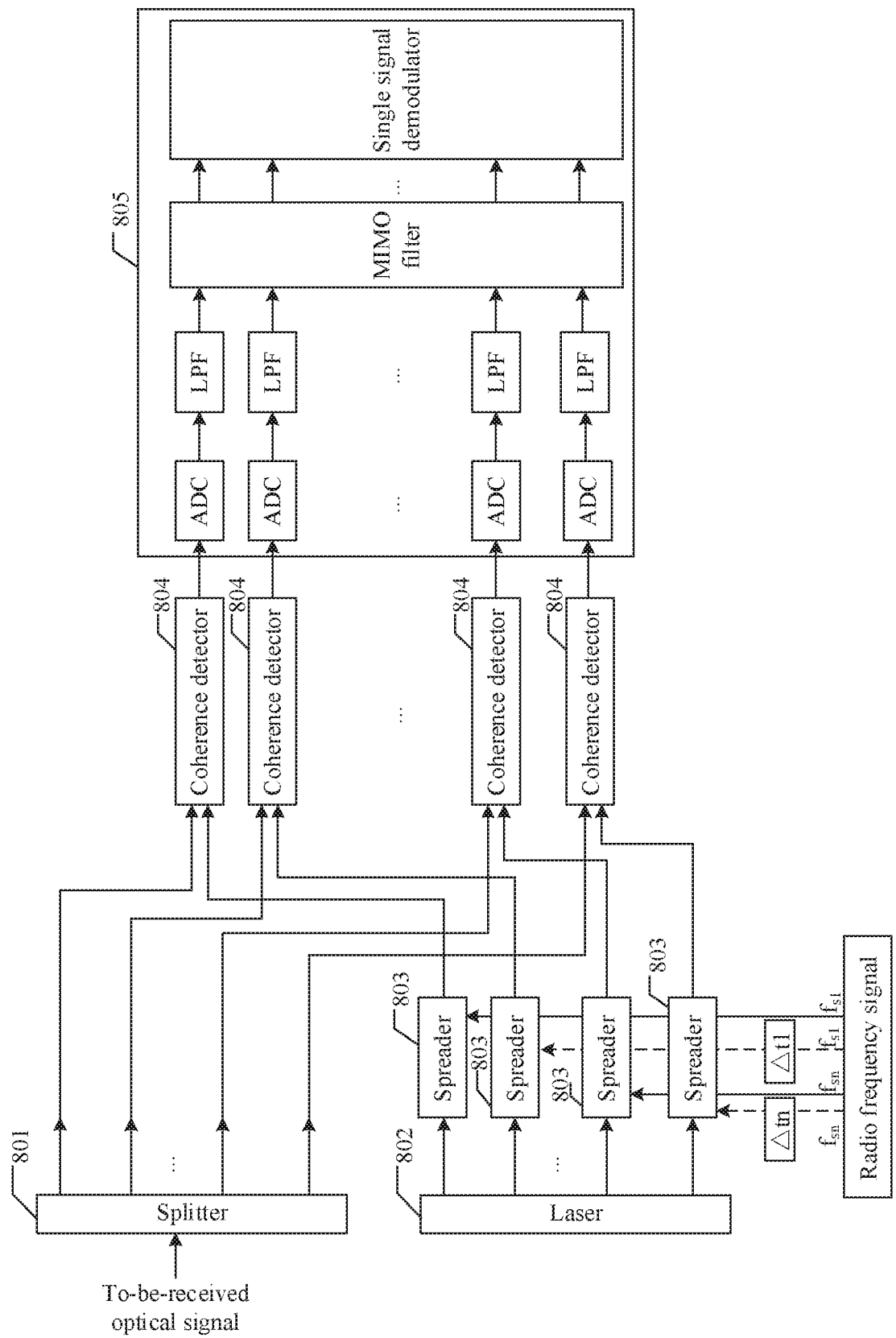
FIG. 8 is a schematic structural diagram of an optical receiver according to Embodiment 6 of this application.

FIG. 8 is a schematic structural diagram of an optical receiver according to Embodiment 6 of this application.

A solution used by the optical receiver in Embodiment 6 is as follows: Frequency shifting is performed in optical domain by using a spread spectrum signal as a coherence detection signal. After local oscillator light signal is split into a plurality of signals, the plurality of paths of signals are separately spread to corresponding frequencies, and then the plurality of paths of signals and a to-be-received signal are connected to a plurality of coherence detectors for coherence detection. Then, an electrical signal output later enters a signal processor for demodulation.

The optical receiver includes a splitter 801, a laser 802, M spreaders 803, M coherence detectors 804, and a demodulator 805. M is equal to a quantity of optical signals combined by a combiner included in an optical transmitter. The optical transmitter may be the optical transmitter described in any one of Embodiment 1 to Embodiment 4.

The splitter 801 is configured to: split a to-be-received optical signal from the optical transmitter to obtain M optical signals, and correspondingly transmit the M optical signals to the M coherence detectors, where one coherence detector corresponds to one optical signal.

The laser 802 is configured to: generate M local oscillator optical signals, and correspondingly transmit the M local oscillator optical signals to the M spreaders, where one spreader corresponds to one local oscillator optical signal. The laser 802 may be implemented by a local laser and a divider, or may be implemented by a device that can generate M optical signals. This is not specifically limited in this application.

Each spreader 803 is configured to: spread, by using a radio frequency signal, a corresponding local oscillator optical signal to obtain a spread optical signal, and transmit the spread optical signal to a corresponding coherence detector. The spreader may be an MZ.

Frequencies of radio frequency signals used by the M spreaders are in a one-to-one correspondence with and equal to frequencies of M optical signals combined by the combiner in the optical transmitter, and two radio frequency signals with equal frequencies differ by a quarter of a period in time domain.

Figure 8A:
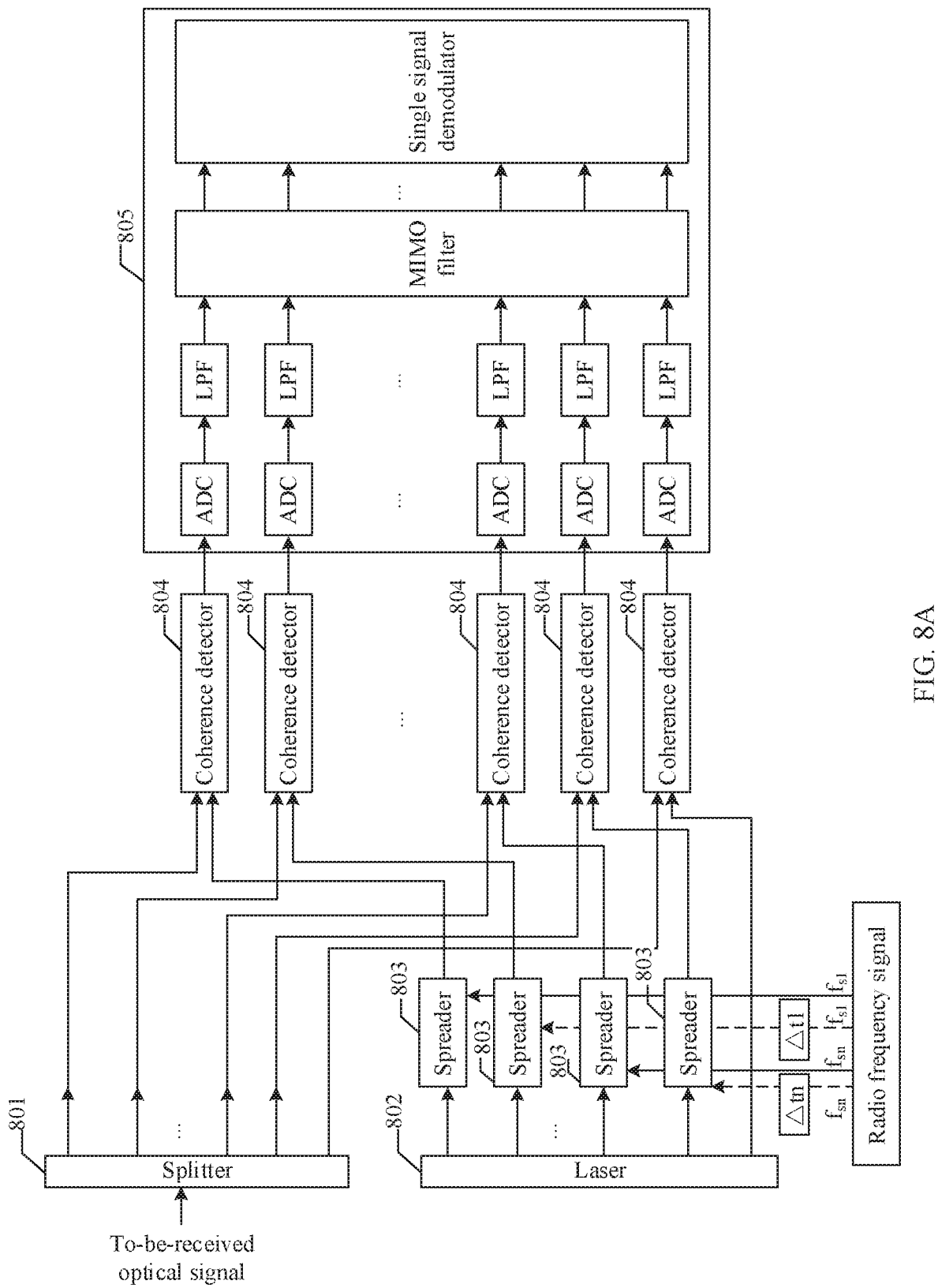
FIG. 8A is a schematic structural diagram of another optical receiver according to Embodiment 6 of this application.

For example, when M is an even number, and the optical transmitter has a structure of the optical transmitter described in the embodiment corresponding to FIG. 3, FIG. 3A, FIG. 4, FIG. 5, or FIG. 6, spreading frequencies of the spreaders in the optical transmitter are $f_{s1}, f_{s2}, \ldots,$ and $f_{sn}$, that is, spreading frequencies used to generate the M(=2*n) optical signals combined by the combiner are $f_{s1}, f_{s1}, f_{s2}, f_{s1}, \ldots,$ and $f_{sn}$ and $f_{sn}$, and two spread spectrum signals with equal frequencies differ by a quarter of a period in time domain. As shown in FIG. 8, the difference is implemented through delaying. When M is an odd number, and one of the signals combined by the combiner in the optical transmitter does not participate in spreading, that is, the optical transmitter has the structure of the optical transmitter described in the embodiment corresponding to FIG. 3B, FIG. 4A, or FIG. 5A, one signal does not participate in spreading, as shown in FIG. 8A.

Each coherence detector 804 is configured to perform, by using a spread optical signal from a corresponding spreader 803, correlation detection on an optical signal from a corresponding splitter, to obtain an electrical signal, so that M electrical signals are obtained.

The demodulator 805 is configured to demodulate the M electrical signals to obtain original data corresponding to the to-be-received optical signal. Optionally, the demodulator 805 may be implemented by M ADCs and a digital signal processor DSP.

The demodulator 805 may include M analog-to-digital converters (ADC), M low-pass filters (LPF), a MIMO filter, and a circuit signal demodulator.

After the coherence detection of the coherence detector 804, the output M electrical signals are converted into digital signals by using corresponding ADCs. Then, a high frequency part is removed from each digital signal by using a corresponding low-pass filter, then the M signals are demultiplexed by using the MIMO filter, and finally, a single signal demodulator demodulates the M demultiplexed signals to obtain original data through recovery.

Figure 8B:
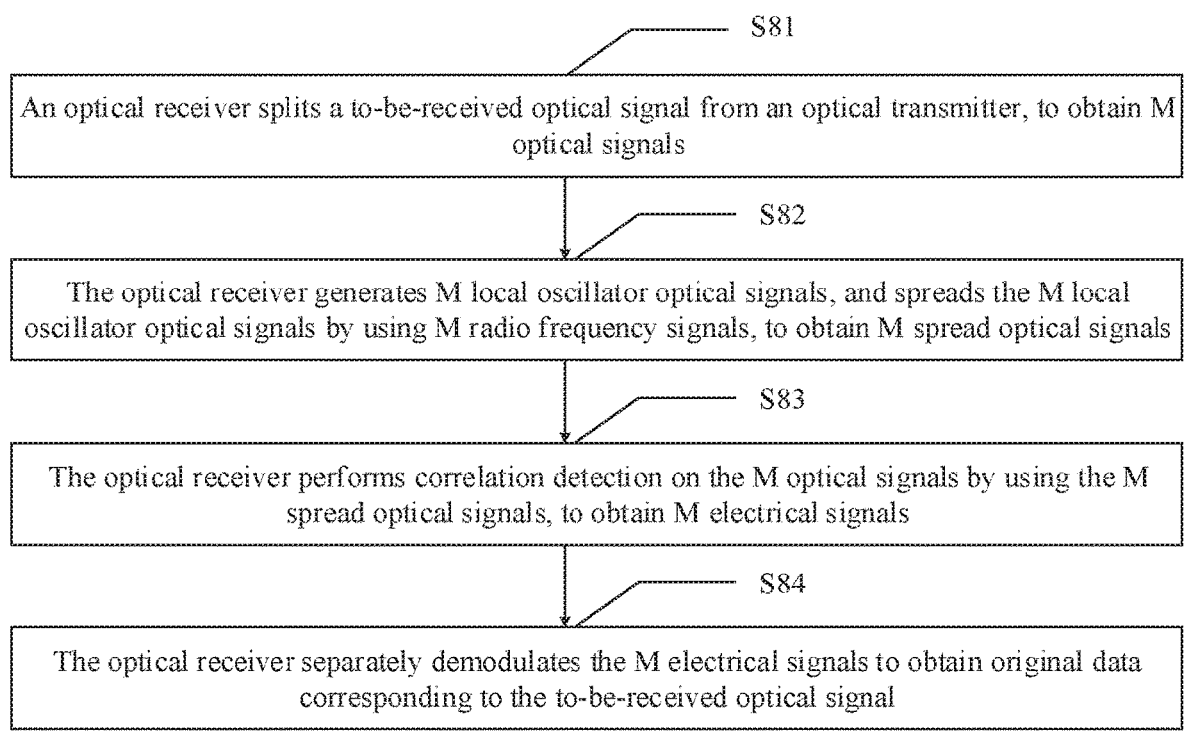
FIG. 8B is a flowchart of an optical transmission method according to an embodiment of this application.

Based on an inventive concept the same as that of the embodiments corresponding to FIG. 8 and FIG. 8A, an embodiment of this application further provides an optical transmission method. As shown in FIG. 8B, the method is specifically implemented by an optical receiver, and the method includes the following steps.

S81. The optical receiver splits a to-be-received optical signal from an optical transmitter, to obtain M optical signals.

S82. The optical receiver generates M local oscillator optical signals, and spreads the M local oscillator optical signals by using M radio frequency signals, to obtain M spread optical signals.

Frequencies of the M radio frequency signals are in a one-to-one correspondence with and equal to frequencies of M optical signals that are combined by the optical transmitter, and two radio frequency signals with equal frequencies differ by a quarter of a period in time domain.

S83. The optical receiver performs correlation detection on the M optical signals by using the M spread optical signals, to obtain M electrical signals. The M spread optical signals are in a one-to-one correspondence with the M optical signals.

S84. The optical receiver separately demodulates the M electrical signals to obtain original data corresponding to the to-be-received optical signal.

Figure 9:
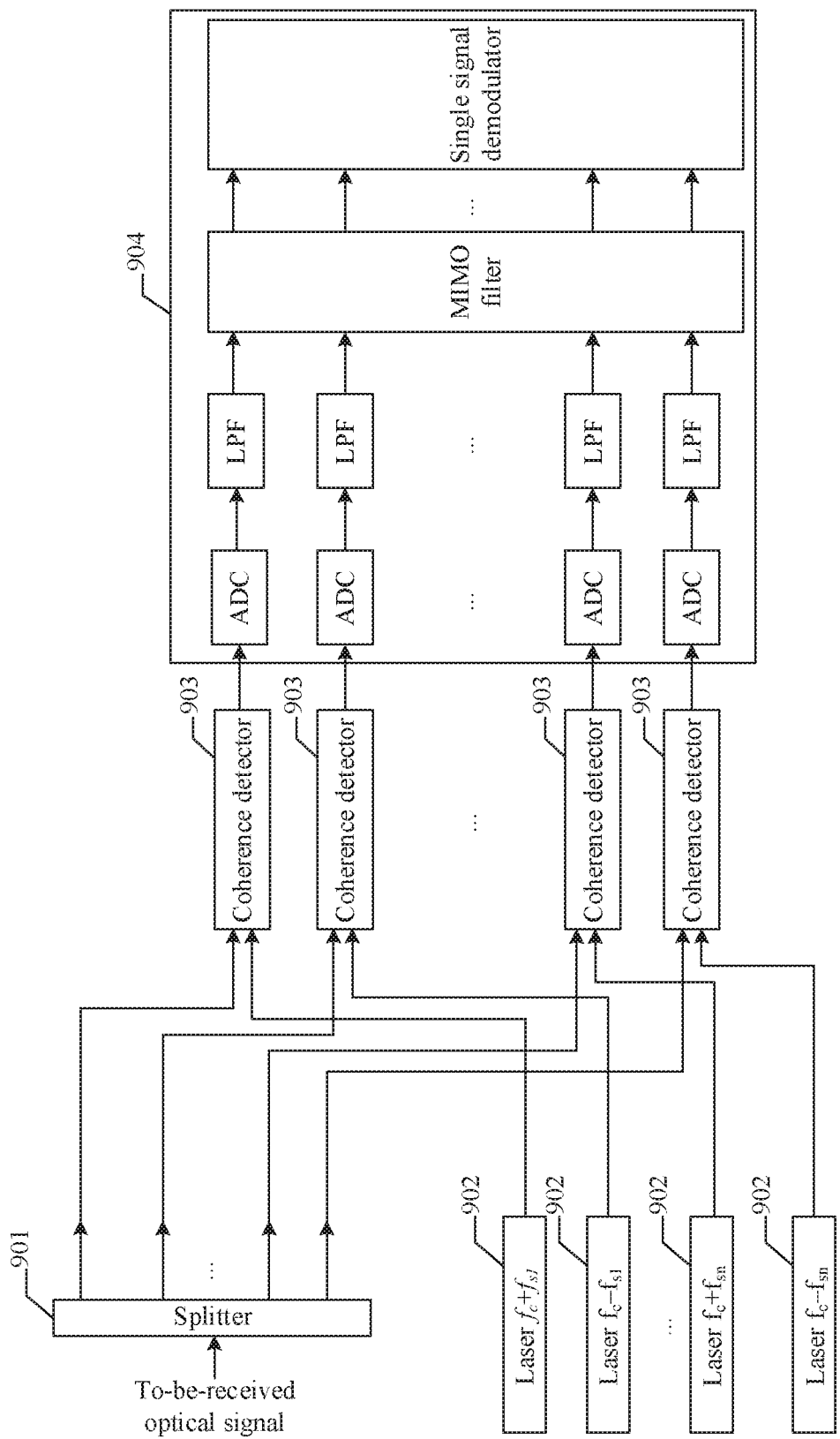
FIG. 9 is a schematic structural diagram of an optical receiver according to Embodiment 7 of this application.

FIG. 9 is a schematic structural diagram of an optical receiver according to Embodiment 7 of this application.

A solution used by the optical receiver in Embodiment 7 is as follows: A to-be-received optical signal is despread by using a wavelength-independent laser in optical domain. A plurality of local oscillator optical signals that are generated by a plurality of wavelength-independent lasers and that work at different subcarrier frequencies enter a plurality of separate coherence detectors for coherence detection with the to-be-received optical signal, and electrical signals output later enter a signal processor for demodulation.

The optical receiver includes a splitter 901, M lasers 902, M coherence detectors 903, and a demodulator 904. M is equal to a quantity of optical signals combined by a combiner included in an optical transmitter. The optical transmitter may be the optical transmitter described in any one of Embodiment 1 to Embodiment 4.

The splitter is configured to: split a to-be-received optical signal from the optical transmitter to obtain N optical signals, and correspondingly transmit the N optical signals to the M coherence detectors.

Each laser 902 is configured to generate an optical carrier signal, where frequencies of optical carrier signals generated by different lasers are different, and frequencies of M optical carriers generated by the M lasers are in a one-to-one correspondence with and equal to carrier frequencies of M optical signals combined by the combiner included in the transmitter.

Each coherence detector 903 is configured to perform, by using a received optical carrier signal, correlation detection on an optical signal from the splitter, to obtain an electrical signal, so that M electrical signals are obtained.

The demodulator 904 is configured to separately demodulate the M electrical signals to obtain original data corresponding to the to-be-received optical signal.

For example, when M is an even number, and the optical transmitter has a structure of the optical transmitter described in the embodiment corresponding to FIG. 3, FIG. 3A, FIG. 4, FIG. 5, or FIG. 6, spreading frequencies of the spreaders in the optical transmitter are $f_{s1}$, $f_{s2}$, ..., and $f_{sn}$, and carrier frequencies included in the M(=2*n) optical signals combined by the combiner are $f_c+f_{s1}$, $f_c-f_{s1}$, $f_c+f_{s2}$, $f_c-f_{s2}$, ..., $f_c+f_{sn}$, and $f_c-f_{sn}$. As shown in FIG. 9, f represents a frequency of an unspread optical carrier. When M is an odd number, and one of the signals combined by the combiner in the optical transmitter does not participate in spreading, that is, the optical transmitter has the structure of the optical transmitter described in the embodiment corresponding to FIG. 3B. FIG. 4A, or FIG. 5A, a carrier frequency of a laser corresponding to a $(2*N+1)^{th}$ path is $f_c$, as shown in FIG. 9A.

The demodulator 904 may include M analog-to-digital converters, M low-pass filters, a MIMO filter, and a circuit signal demodulator.

After the coherence detection of the coherence detector 903, the output M electrical signals are converted into digital signals by using corresponding ADCs. Then, a high frequency part is removed from each digital signal by using a corresponding low-pass filter, then the M signals are demultiplexed by using the MIMO filter, and finally, a single signal demodulator demodulates the M demultiplexed signals to obtain original data through recovery.

Figure 9A:
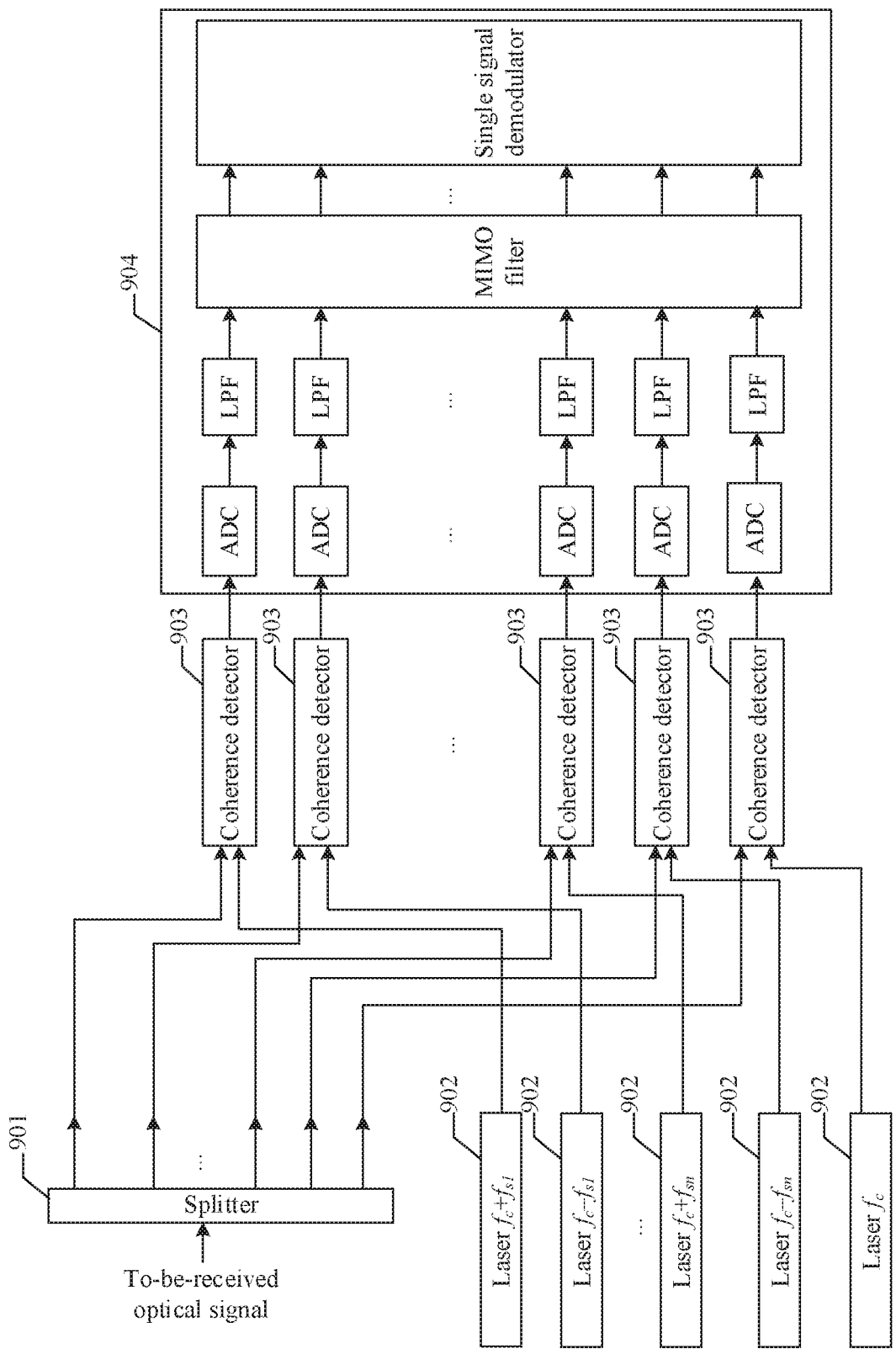
FIG. 9A is a schematic structural diagram of another optical receiver according to Embodiment 7 of this application.
Figure 9B:
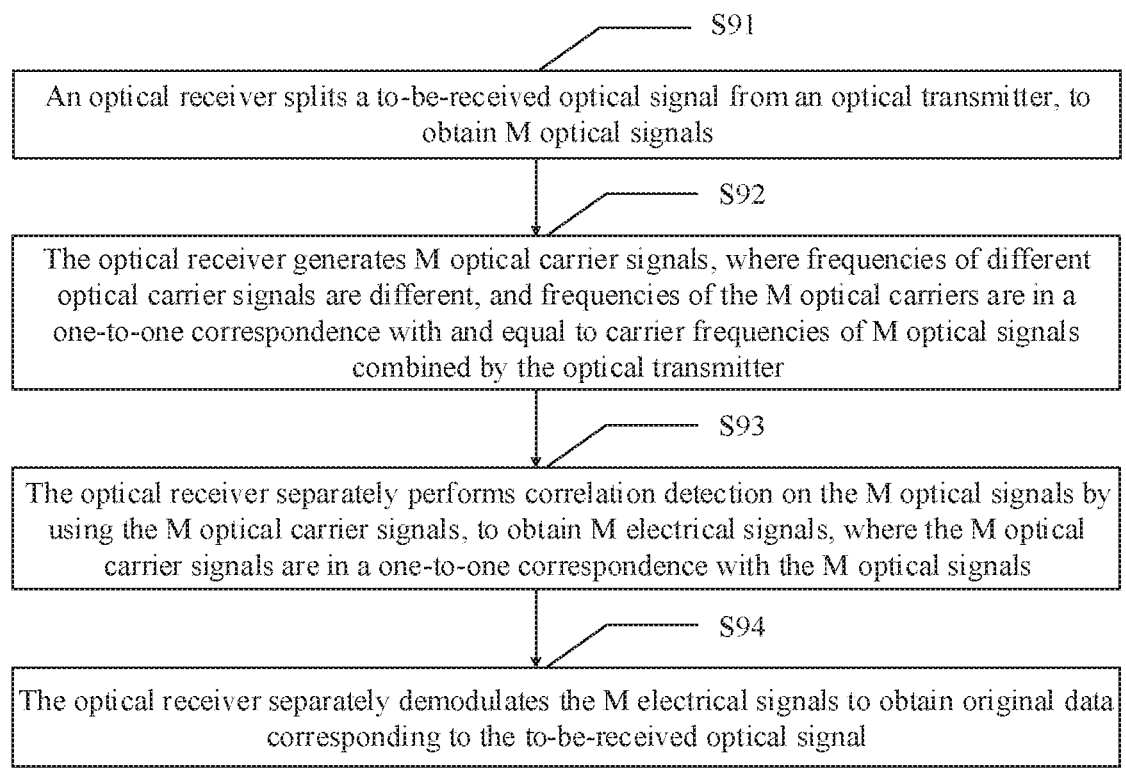
FIG. 9B is a flowchart of an optical transmission method according to an embodiment of this application.

Based on an inventive concept the same as that of the embodiments corresponding to FIG. 9 and FIG. 9A, an embodiment of this application further provides an optical transmission method. As shown in FIG. 9B, the method is specifically implemented by an optical receiver, and the method includes the following steps.

S91. The optical receiver splits a to-be-received optical signal from an optical transmitter, to obtain M optical signals.

S92. The optical receiver generates M optical carrier signals, where frequencies of different optical carrier signals are different, and frequencies of the M optical carriers are in a one-to-one correspondence with and equal to carrier frequencies of M optical signals combined by the optical transmitter.

S93. The optical receiver separately performs correlation detection on the M optical signals by using the M optical carrier signals, to obtain M electrical signals, where the M optical carrier signals are in a one-to-one correspondence with the M optical signals.

S94. The optical receiver separately demodulates the M electrical signals to obtain original data corresponding to the to-be-received optical signal.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of this application without departing from the scope of the embodiments of this application. This application is intended to cover these modifications and variations provided that they fall within the scope of protection defined by the following claims and their equivalent technologies of this application.

What is claimed is:

1. An optical transmitter, comprising:
    an optical signal generator, N spreaders, N pairs of data modulators, and a combiner, wherein N is a positive integer; and
    the optical signal generator is configured to generate N optical carriers with a single wavelength;
    an $i^{th}$ spreader is configured to: spread an $i^{th}$ optical carrier generated by the optical signal generator, to obtain a spread optical signal having two subcarriers, wherein frequencies of spread optical signals generated by different spreaders are different; and split the spread optical signal into two signals, wherein the two signals are a first optical signal and a second optical signal, and delay the second optical signal to obtain a third optical signal;
    an $i^{th}$ pair of data modulators are configured to: modulate the first optical signal and the third optical signal that are obtained by the $i^{th}$ spreader through processing, to obtain a pair of modulated optical signals, and transmit the pair of modulated optical signals to the combiner, wherein the pair of modulated optical signals reaching the combiner differ by $1/(4f_{si})$ in time domain, $f_{si}$ represents a spreading frequency of the $i^{th}$ spreader, and i is any positive integer not greater than N; and the combiner is configured to: combine, into one optical signal, N pairs of modulated optical signals transmitted by the N pairs of data modulators, and send the optical signal.

2. The optical transmitter according to claim 1, wherein the $i^{th}$ spreader comprises a Mach-Zehnder modulator (MZ), a splitter, and a delayer, wherein the MZ is configured to spread, by using a radio frequency signal, the $i^{th}$ optical carrier generated by the optical signal generator, to obtain the spread optical signal having two subcarriers, wherein a frequency spacing of the two subcarriers of the spread optical signal is twice a frequency of the used radio frequency signal, and frequencies of radio frequency signals used by different MZs are different;

the splitter is configured to split the spread optical signal into the first optical signal and the second optical signal; and the delayer is configured to delay the second optical signal to obtain the third optical signal.

3. The optical transmitter according to claim 1, wherein the $i^{th}$ spreader comprises a Mach-Zehnder modulator (MZ) and a delayer, wherein the MZ is configured to: spread, by using a radio frequency signal, the $i^{th}$ optical carrier generated by the optical signal generator, to obtain the spread optical signal having two subcarriers, and split the spread optical signal into the first optical signal and the second optical signal, wherein a frequency spacing of the two subcarriers of the spread optical signal is twice a frequency of the used radio frequency signal, and frequencies of radio frequency signals used by different MZs are different; and the delayer is configured to delay the second optical signal to obtain the third optical signal.

4. The optical transmitter according to claim 1, wherein the $i^{th}$ spreader comprises a microring resonant cavity (MR), a splitter, and a delayer, wherein the MR is configured to spread the $i^{th}$ optical carrier generated by the optical signal generator, to obtain the spread optical signal having two subcarriers;

the splitter is configured to split the spread optical signal into the first optical signal and the second optical signal; and the delayer is configured to delay the second optical signal to obtain the third optical signal.

5. The optical transmitter according to claim 1, wherein in addition to the N pairs of data modulators, the optical transmitter further comprises a first data modulator; and the optical signal generator is further configured to: generate an $(N+1)^{th}$ optical carrier with the single wavelength, and transmit the $(N+1)^{th}$ optical carrier with the single wavelength to the first data modulator;

the first data modulator is configured to: perform data modulation on the $(N+1)^{th}$ optical carrier to obtain a first modulated optical signal, and transmit the first modulated optical signal to the combiner; and the combiner is configured to: combine, into one optical signal, the N pairs of modulated optical signals transmitted by the N pairs of data modulators and the first modulated optical signal transmitted by the first data modulator, and send the optical signal.

* * * * *